(12) United States Patent
Albahri

(10) Patent No.: US 7,843,611 B2
(45) Date of Patent: Nov. 30, 2010

(54) HIGH SPEED FLATBED SCANNER COMPRISING DIGITAL IMAGE-CAPTURE MODULE WITH TWO-DIMENSIONAL OPTICAL IMAGE PHOTO-SENSOR OR DIGITAL CAMERA

(75) Inventor: Tareq Abduljalil Albahri, Jaber Al-Ali (KW)

(73) Assignee: Kuwait University, Safat (KW)

( * ) Notice: Subject to any disclaimer, the term of this patent is extended or adjusted under 35 U.S.C. 154(b) by 349 days.

(21) Appl. No.: 11/779,281

(22) Filed: Jul. 18, 2007

(65) Prior Publication Data

US 2009/0021798 A1 Jan. 22, 2009

(51) Int. Cl.
*H04N 1/04* (2006.01)
(52) U.S. Cl. .................. 358/474; 358/408; 358/475; 348/262; 348/207.99
(58) Field of Classification Search .............. 358/474, 358/471, 482, 505, 475, 512–514, 408; 250/208.1, 250/239, 216; 399/211; 348/262, 222.1, 348/207.1, 207.11, 207.99, 370
See application file for complete search history.

(56) References Cited

U.S. PATENT DOCUMENTS

| | | |
|---|---|---|
| 3,752,558 A | 4/1973 | Lloyd |
| 3,888,584 A | 6/1975 | Smith |
| 4,068,950 A | 1/1978 | Kito |
| 4,145,138 A | 3/1979 | Mercure |
| 4,178,093 A | 12/1979 | Yanagawa |
| 4,415,255 A | 11/1983 | Hubar |
| 4,422,100 A | 12/1983 | Duvall |
| 4,567,528 A | 1/1986 | Wilmon |
| 4,585,334 A | 4/1986 | Maiyon |
| 4,633,080 A | 12/1986 | Wilman |
| 4,645,332 A | 2/1987 | Maiyon |
| 4,660,094 A | 4/1987 | Yoshimoto |
| 4,711,554 A | 12/1987 | Nishimori |
| 4,831,455 A | 5/1989 | Ishikawa |
| 4,839,693 A | 6/1989 | Kawaguchi |
| 4,941,125 A | 7/1990 | Boyne |
| 4,957,689 A | 9/1990 | Ohnishi |
| 5,006,895 A | 4/1991 | Hashimoto |
| 5,012,275 A | 4/1991 | Bock |
| 5,053,819 A | 10/1991 | Malyon |
| 5,072,252 A | 12/1991 | Howseman |
| 5,084,732 A | 1/1992 | Tsaur |
| 5,150,227 A | 9/1992 | Koshiyouji |
| 5,164,845 A | 11/1992 | Takeuchi |
| 5,212,568 A | 5/1993 | Graves |
| 5,221,974 A | 6/1993 | Kusumoto |

(Continued)

*Primary Examiner*—Cheukfan Lee
(74) *Attorney, Agent, or Firm*—Richard C. Litman

(57) ABSTRACT

The present invention is a flatbed scanner operating with a digital image capture module comprising two-dimensional (2D) optical image photo-sensor and in particular with a digital camera or digital video camera. The present invention further relates to flatbed scanners and means and methods of supporting cameras, and particularly, although not exclusively, to a flatbed scanner housing for holding a digital camera to allow the digital camera to act as a document capture device in obtaining digital images suitable for downloading to a personal computer or other computer peripherals such as a printer. The scanner incorporates an image capturing module comprising 2D image photosensor and assembly such as flash light, electronic circuit, and software inside the flatbed scanner box to function like an image capturing module where said scanner box functions like the camera body with an internal lens internal.

1 Claim, 11 Drawing Sheets

U.S. PATENT DOCUMENTS

| | | |
|---|---|---|
| 5,254,847 A | 10/1993 | Hata |
| 5,276,530 A | 1/1994 | Siegal |
| 5,359,207 A | 10/1994 | Turner |
| 5,377,019 A | 12/1994 | Okisu |
| 5,416,609 A | 5/1995 | Matsuda |
| 5,475,441 A | 12/1995 | Parulski |
| 5,475,505 A | 12/1995 | Minasian |
| 5,479,262 A | 12/1995 | Namiki |
| 5,489,993 A | 2/1996 | Ito |
| 5,489,995 A | 2/1996 | Iso |
| 5,493,332 A | 2/1996 | Dalton |
| 5,517,332 A | 5/1996 | Barry |
| 5,523,876 A | 6/1996 | Tellam |
| 5,526,098 A | 6/1996 | Peck |
| 5,572,284 A | 11/1996 | Fuioka |
| 5,574,274 A | 11/1996 | Rubley |
| 5,585,926 A | 12/1996 | Fujii |
| 5,610,731 A | 3/1997 | Itoh |
| 5,614,991 A | 3/1997 | Moro |
| 5,616,914 A | 4/1997 | Matsuda |
| 5,619,302 A | 4/1997 | Wu |
| 5,636,006 A | 6/1997 | Wu |
| 5,644,663 A | 7/1997 | Saito |
| 5,689,348 A | 11/1997 | Takahashi |
| 5,708,508 A | 1/1998 | Soma |
| 5,712,718 A | 1/1998 | Chen |
| 5,726,775 A | 3/1998 | Walsh |
| 5,751,461 A | 5/1998 | Chen |
| 5,754,226 A | 5/1998 | Yamada |
| 5,777,660 A | 7/1998 | Ard |
| 5,781,313 A | 7/1998 | Nose |
| 5,801,849 A | 9/1998 | Soloveychik |
| 5,814,809 A | 9/1998 | Han |
| 5,847,846 A | 12/1998 | Wu |
| 5,847,884 A | 12/1998 | Kamon |
| 5,870,624 A | 2/1999 | Kikinis |
| 5,907,413 A | 5/1999 | Han |
| 5,914,616 A | 6/1999 | Young |
| 5,917,616 A | 6/1999 | Chou |
| 5,920,342 A | 7/1999 | Umeda |
| 5,995,245 A | 11/1999 | Moro |
| 6,104,497 A | 8/2000 | Cohen |
| 6,118,484 A | 9/2000 | Yokota |
| 6,208,438 B1 * | 3/2001 | Watanabe et al. ............ 358/488 |
| 6,304,313 B1 | 10/2001 | Honma |
| 6,377,382 B1 | 4/2002 | Kato |
| 6,389,183 B1 | 5/2002 | Han |
| 6,459,510 B1 | 10/2002 | Brewer |
| 6,540,415 B1 | 4/2003 | Slatter |
| 6,545,769 B2 | 4/2003 | Collard |
| 6,603,580 B1 | 8/2003 | Taillie |
| 6,608,707 B1 | 8/2003 | Han |
| 6,747,764 B1 * | 6/2004 | Chu ........................ 358/474 |
| 6,763,141 B2 | 7/2004 | Xu |
| 6,812,995 B2 | 11/2004 | Honma |
| 6,862,074 B2 | 3/2005 | Tretiakoff |
| 2003/0117670 A1 | 6/2003 | Brugger |
| 2003/0122953 A1 | 7/2003 | Huang |
| 2003/0194111 A1 | 10/2003 | Kano |
| 2003/0198398 A1 | 10/2003 | Guan |
| 2003/0202095 A1 | 10/2003 | Schultz |
| 2004/0021915 A1 | 2/2004 | Lee |
| 2004/0095620 A1 | 5/2004 | Lin |
| 2004/0169894 A1 | 9/2004 | Scahroath |
| 2004/0201870 A1 | 10/2004 | Araki |
| 2004/0218231 A1 | 11/2004 | Sheng |
| 2004/0234311 A1 | 11/2004 | Adams |
| 2004/0268096 A1 | 12/2004 | Master et al. |
| 2005/0019072 A1 | 1/2005 | Lin |
| 2005/0073733 A1 | 4/2005 | Kim |
| 2005/0237584 A1 | 10/2005 | Lee et al. |
| 2006/0193533 A1 | 8/2006 | Araki |
| 2008/0024836 A1 * | 1/2008 | Sundnes .................... 358/474 |

\* cited by examiner

HIGH SPEED FLATBED SCANNER COMPRISING DIGITAL IMAGE-CAPTURE MODULE WITH TWO-DIMENSIONAL OPTICAL IMAGE PHOTO-SENSOR OR DIGITAL CAMERA

BACKGROUND OF THE INVENTION

1. Field of the Invention

The present invention relates generally to a document scanner and in particular to a flatbed scanner operating with a digital image capture module comprising two-dimensional (2D) optical image photo-sensor and in particular with a digital camera or digital video camera. The present invention further relates to flatbed scanners and means and methods of supporting cameras, and particularly, although not exclusively, to a flatbed scanner housing for holding a digital camera to allow the digital camera to act as a document capture device in obtaining digital images suitable for downloading to a personal computer or other computer peripherals such as a printer. The present invention further relates to a flatbed scanner housing holding a digital camera to allow the digital camera to act as a document capture device in obtaining digital images of hard to scan bound documents such as the opposing pages of thick books without any distortion at the protruding binding edge. The flatbed scanner of the present invention has the advantage of high speed instantaneous image capture of documents, low operation and energy costs, and is ideal for image capture of hard to scan objects such as bound documents especially near the binding edge that are inaccessible for the conventional flatbed scanners image reading heard.

2. Prior Art Reference and Discussion

It is known in the prior art to employ scanning devices to digitally record an image, commonly being a paper-based document e.g. a letter or photograph. Such scanning devices can download the digitally recorded data to a computer or other image processor where the data can be displayed on a visual display unit. This process enables the user to download an image of a document to a computer where the document can be manipulated or amended to the user's satisfaction. Following this, the document may be e-mailed, used in an electronic fax transmission, kept for later viewing or simply printed. Flatbed scanners are an additional option to incorporate into a desktop computer at additional expense. Known flatbed scanners comprise a base unit having a scan area to support a document or object being scanned. The flatbed scanner has a size dependent on the size of document for which the scanner is intended to image. Thus the desk top "foot print" of the scanner can be relatively large. Conventional flatbed scanners have resolution of the order of 600 dpi, which provides relatively high quality images, and it is common with more expensive prior art scanners to have resolution higher than 600 dpi.

There are several types of scanners available: scanner apparatus of the drum type, sheet-fed scanner, hand held scanner, flatbed scanner, and photographed image scanner which is the subject of this invention. A document scanner is comprised of a light source projecting a scanning beam to a document to be scanned. The scanning beam is reflected by or transmitted through the document and then received by optic detection devices which convert the reflected beam into electrical signals for further processing. An optic detection device that is commonly employed in the document scanner is a charge coupling device (CCD) although other types such as a charge injection device (CID), optical complementary metal oxide semiconductor (CMOS) array, an optical bipolar junction transistor (BJT) array, a photogate array, or a photodiode array are also used.

Recently, there have appeared digital cameras which have enabled an individual user to take high quality pictures, stored as digital images which can be downloaded to the user's personal computer. This is also the case with digital video camera. In fact many digital video cameras can be used as a still frame camera as well as for recording moving images. The resolution of digital cameras is rapidly increasing already being sufficient to capture legible images of A4/US letter pages and text will soon be able to rival the resolution provided by a flat bed scanner. These document reading apparatus employ an image capture mechanism incorporating a two-dimensional image reading photo-sensor (referred to as a 2D photo-sensor type) instead of the conventional one-dimensional image reading photo-sensor (referred to as a 1D or line photo-sensor type). An apparatus of the 2D photo-sensor type has a small number of 2D photo-sensor pixels and thus in the past had difficulty in reading images at a resolution high enough to clearly reproduce a color image or to be able to optically recognize characters on a document. Consequently, for image capture of documents, these types of photo-sensors were usually incorporated in an assembly comprising either a moving scanner (image reading) head or with a plurality of moving mirrors to compensate for the low resolution by sequential image capture.

In an image forming device including an image reading device such as a scanner, dot signals for one scanning line are detected by a 1D optical image photo-sensor usually a CCD photo-sensor. The CCD photo-sensor is placed in a moving scanner (image reading) head to sequentially scan an image horizontally one dpi at a time which slows down image capture. Although with that method of scanning higher resolutions may be obtained with a conventional moving-head flatbed scanners that it was possible with 2D digital image capture modules such as digital camera and digital video cameras, when scanning at high resolution of 600 dpi the scanning process takes longer time as the scanner image reading head moves slower compared to a resolution of 300 dpi for example.

The resolution of the 2D optical image (CCD) photo-sensor has ever since been increasing and its price dropping making it very attractive for use for instantaneous image capture. For example, 17 mega pixel photo-sensors are now available commercially (Canon EOS 1Ds Mark II 17.2 mega pixel digital camera). This is equivalent to an A4 size image with 250 pixels/inch resolution in 8 bit/channel RGB color which is good for most color image applications. It is also equivalent to an A4 size image with 430 pixels/inch resolution in 8 bit/channel grayscale which is more than that required for optical character recognition of fine text (8 point font). It is also equivalent to an A4 size image with 1200 pixels/inch resolution in bitmap which is four times more than that required for optical character recognition of black and white fine text.

A conventional scanner, which is called "flatbed" scanner, usually comprises a scanning module, a drive belt, signal transmission belt, a gear module, and a driving device. The driving device drives the transmission belt. It also comprises a cold cathode fluorescent lamp (CCFL) as the light source. The CCFL provides high brightness for scanning operation. However, the conventional flatbed scanner has the following disadvantages:

(1) The CCFL of a conventional flatbed scanner is operated with high voltage leading to the following disadvantages: high cost for providing the high voltage to drive the CCFL, safety concerns for the high voltage that drives the CCFL and the additional expense for safety increases the overall costs of the flatbed scanner, in addition, the up-transformation of voltage induces noise to the scanning operation of the flatbed scanner and thus adversely affects the scanning result.

(2) The regular power consumption of the CCFL is around 2.5 W, which makes it impractical to use the power interface regularly devised in a laptop computer since the battery is drained very rapidly. As such conventional flatbed scanners are energy inefficient and cannot be operated with batteries. Thus, an additional power adaptor is required. This also increases the costs and limits mobility. The higher power consumption further makes conventional flatbed scanners environmentally unfriendly.

(3) Flatbed scanners require method and apparatus for securing the scanner carriage. The belt could snap, scanner (image reading) head movement could generate noise which affects the image quality, and drive motor could malfunction.

(4) Image scanning is done sequentially line-by-line one dpi at a time with the scanning (image reading) head moving slowly. This type of linear image capture mechanism slows down image capture especially when scanning at high resolution leading to significant time consumption with extra cost for energy and manpower.

(5) Larger scanning time is required for higher image resolutions resulting in even higher energy and manpower costs.

(6) Conventional flatbed scanners usually take extra time to warm-up which adds more to the scanning time.

(7) Conventional flatbed scanners cannot usually be operated in a standalone mode and must be interfaced with PC which limits its functionality and mobility. Furthermore, remote control operation is also unprecedented.

(8) Conventional flatbed scanners are limited in paper size requiring larger scanning head for larger paper format with the extra cost.

(9) The space required by the moving image reading head incorporated in the conventional flatbed scanner makes it difficult to provide enough scanning glass room making it rather hard to scan bound documents such as books internal edges for example especially near the binding edge.

(10) Professional quality flatbed scanners are heavy weight and difficult to move and transport which affects the functionality and portability of the scanner.

(11) Conventional flatbed scanners comprise complicated driving mechanism with moving parts, mechanical assembly, or reflection mirror systems that are subject to wear and break down; The moving belt could snap, scanner head movement could generate noise which affects the image quality, and drive motor could also malfunction which makes the scanner less durable. Furthermore, the associated driving mechanism and reflection mirror system increase operation cost.

(12) Conventional flatbed scanners use constant illumination source (such as florescent light) during the whole scanning process which could take up to 2 minutes for one image scan. This result in high energy consumption per scanned image in addition to the power required to drive the motor to move the scanning head. Moreover, the light source is subject to malfunction.

It is thus desired to have a flatbed scanner that overcomes the above problems.

Among the prior art literatures that describe technologies related to these document reading apparatuses are the U.S. patents discussed below the teachings of which are incorporated herein by reference.

U.S. Pat. No. 4,831,455 (1989) to Ishikawa et al. and U.S. Patent Application no. 20030231354 (2003) to Shinoda et el. disclose a picture reading apparatus which comprises an electronic camera which converts a picture to be read to an electric signal and a supporting member for supporting the camera movably. The patent does not disclose or claim use of the invention in a flatbed scanner arrangement or incorporating the camera therein to function for the purpose of capturing images like a flatbed scanner.

U.S. Pat. No. 5,920,342 (1999) to Umeda et al. discloses an image input apparatus for capturing images of multiple resolutions comprising transferring an image signal from an electronic camera head to a personal computer and a supporting member for supporting the camera movably. The patent does not disclose or claim use of the invention in a flatbed scanner arrangement or incorporating the camera therein to function for the purpose of capturing images like a flatbed scanner.

U.S. Pat. No. 6,540,415 (2003) to Slatter et al. discloses a stand that facilitates and supports the use of digital cameras including digital video cameras in performing an equivalent function to a scanner in recording digital images which may be downloaded to a computer. The stand incorporates means for automatically configuring the camera into a mode of operation for document image capture on placing said camera into said stand. The patent does not disclose or claim use or incorporating of the digital camera in a flatbed scanner arrangement. In addition the said method poses difficulties in positioning the document for scanning. The images to be captured are placed on a table facing up with might not always be appropriate for image capture. In a flatbed arrangement the documents are usually placed facing down and pressed down flat into intimate contact with the scanning window. This feature is lacking in that invention which affects the produced image quality. The method further discloses imaging and combining low resolution six-point-text (135 dots per inch each) to provide one legible (high resolution) image when downloaded to a computer which is a major disadvantage time-wise.

U.S. Pat. No. 6,304,313 (2001), U.S. Pat. No. 6,812,995 (2004) and U.S. Patent Application no. 20010046036 (2001) all to Honma disclose a document processing system comprising a digital camera which performs accurate document reading, wherein a document is divided into blocks and each block is sensed by a CCD. An OCR process is performed on the image data to convert the corrected image data to text data which is output for further use. The patent does not disclose or claim use of the invention in a flatbed scanner arrangement or incorporating the camera therein to function for the purpose of capturing images like a flatbed scanner Furthermore, dividing the document to be scanner into blocks and sensing each block individually requires a plurality of CCD photo-sensors which is a major disadvantage both in terms of time and cost.

U.S. Patent Application no. 20030194111 (2003) to Kano et al. discloses a document reading apparatus comprising a table on which a document is set and a mounted 2D CCD image photo-sensor for image capture. The patent does not disclose or claim use of the invention in a flatbed scanner arrangement or incorporating the camera therein to function for the purpose of capturing images like a flatbed scanner. The patent further discloses a document reading apparatus comprising a 1D CCD image photo-sensor comprising a motor which drives the photo-sensor in a sub-scan direction thus having the same disadvantages of the conventional flatbed scanner.

U.S. Pat. No. 4,941,125 (1990) to Boyne discloses using a digital camera to scan documents and generate a corresponding digital output signal. A data processor receives the digital output signal and generates corresponding index information. The video and index information are then stored on one or more optical disks for search and retrieval. The patent does not disclose or claim use of the invention in a flatbed scanner arrangement or incorporating the camera therein to function for the purpose of capturing images like a flatbed scanner.

U.S. Pat. No. 5,475,441 (1995) to Parulski et al. discloses an electronic camera with memory card interface to a computer. The patent does not disclose or claim use of the invention in a flatbed scanner arrangement or incorporating the camera therein to function for the purpose of capturing images like a flatbed scanner.

U.S. Pat. No. 5,477,264 (1995) to Sarbadhikari et al. discloses an electronic imaging system includes a digital electronic camera for capturing and storing images in a removable storage device, whereby the imaging system further comprises a player device such as a computer. The patent does not disclose or claim use of the invention in a flatbed scanner arrangement or incorporating the camera therein to function for the purpose of capturing images like a flatbed scanner.

U.S. Pat. No. 5,636,006 (1997) and U.S. Pat. No. 5,847,846 (1998) both to Wu disclose apparatus and method for scanning a bound document using a wedge shaped platen with a moving mirror and a stationary 2D CCD image photo-sensor or using a drive assembly to move the document while image capture is accomplished sequentially line-by-line through a stationary 1D CCD imaging device. None of these patents disclose using digital camera as a method of image capture in a flatbed scanning arrangement and further comprise moving parts which have the disadvantages of the conventional flatbed scanner.

U.S. Pat. No. 6,862,074 (2005) to Tretiakoff et al. discloses a portable device for photographing of book pages comprising two collapsible transparent plates and a digital camera. The patent does not disclose or claim use of the invention as a flatbed scanner or incorporating the camera therein to function for the purpose of capturing images like a flatbed scanner.

U.S. Pat. No. 5,814,809 (1998) to Han discloses an optical scanning apparatus for retrieving digital electronic images representative of opaque and transmissive object. The apparatus is equipped with a scanning camera moving within the scanner housing in the same manner as a conventional flatbed scanner, thus the disadvantages of the conventional flatbed scanner still exist.

U.S. Patent Application no. 20030117670 (2003) to Brugger et al. discloses a document scanning system with tethered platen element providing sheet-fed and platen scanning functions. The platen scanner contains a single camera comprised of a CCD or CMOS array and a motor for moving the camera thus the disadvantages of the conventional flatbed scanner still exist. Furthermore, the patent does not disclose or claim use of the invention in a flatbed scanner arrangement or incorporating the camera therein to function for the purpose of capturing images like a flatbed scanner.

U.S. Patent Application no. 20040268096 (2004) to Master et al. provides a digital imaging apparatus comprising at least one of a plurality of optical photo-sensors, the plurality of optical photo-sensors comprising: a charge coupling device (CCD), a charge injection device (CID), an optical complementary metal oxide semiconductor (CMOS) array, an optical bipolar junction transistor (BJT) array, a photogate array, or a photodiode array. The patent does not disclose or claim use of the invention in a solid state flatbed scanner arrangement with nonmoving parts or incorporating a digital camera therein to function for the purpose of capturing images like a flatbed scanner.

U.S. Patent Application no. 20030122953 (2003) to Huang et al. discloses a layout of the optical path in an image capturing system and a method for forming the same. The layout comprises a CCD or CMOS image photo-sensor with plurality of mirrors with improved optical path. The patent does not disclose or claim use of the invention in a solid state flatbed scanner arrangement with nonmoving parts or incorporating a digital camera therein to function for the purpose of capturing images like a flatbed scanner. Furthermore, the invention comprises a plurality of mirrors in a complex arrangement and a small opening for the optical path of image capture suggesting the captured image will have to be moved in front of the opening for image capture, which has the same disadvantages of the conventional flatbed scanner.

U.S. Pat. No. 5,870,624 (1999) to Kikinis discloses a personal desktop system for scanning and printing comprising a stationary line (1D) or area (2D) CCD image sensing with a drive assembly for moving the scanned images while scanning. This patent does not disclose using digital camera as a method of image capture in the flatbed scanning arrangement and further comprises moving parts which have the same disadvantages of the conventional flatbed scanner.

U.S. Patent Application no. 20030095620 (2004) to Lin discloses a flatbed scanner including housing inside which an optic detection system including a 1D CCD is mounted. The invention comprises a plurality of reflective surfaces and devices for reflecting the scanned image and a linearly-moving top platform on which the document is positioned to move the scanned image for the purpose of scanning it. The patent does not disclose or claim incorporating a digital camera in a flatbed scanner to function for the purpose of capturing images like a flatbed scanner. The presence of many components like reflecting surfaces and devices degrades the captured image quality and adds to the total cost of the scanner. Furthermore, the scanner has moving parts requiring motor drive assembly adding more to the cost and has the disadvantages of the conventional flatbed scanner such as breakdowns and the long scanning time since the scanning process with 1D CCD image photo-sensor is done sequentially one line at a time.

U.S. Pat. No. 5,150,227 (1992) to Koshiyouji et al. discloses an apparatus capable of reading a character or graphics image on a document at a plurality or reading linear densities using a 1D CCD photo-sensor for converting the focused light beam into an electric image signal. The carriage device containing the CCD line photo-sensor is moved in an auxiliary scanning direction in a desirable shifting which is determined on the basis of the reading sensitivity of the CCD reading photo-sensor and which corresponds to the linear reading density. The carriage device is motor driven and uses 1D line photo-sensor thus the disadvantages of the conventional flatbed scanner still exist.

U.S. Pat. No. 5,917,413 (1999) to Chou et al. and U.S. Pat. No. 6,545,769 (2003) to Collard et al. disclose an image processing apparatus comprising scanning of originals and converting then into digitized electrical image information using 1D CCD reading photo-sensor. This system comprises a moving linear image scanning components and reflective mirrors thus the disadvantages of the conventional flatbed scanner still exist.

U.S. Pat. No. 5,907,413 (1999), U.S. Pat. No. 6,389,183 (2002) and U.S. Pat. No. 6,608,707 (2003) all to Han disclose a flatbed scanner of the type commonly used as a stand-alone computer peripheral in combination with a contact image photo-sensor module to control the beginning and end of the scanning and accomplish scanning in two directions thus saving the need for carriage return prior to the next scan. The image scanning head is motor driven thus the disadvantages of the conventional flatbed scanner still exist. Furthermore, the patents do not disclose using digital camera or 2D image photo-sensors module as a method of image capture in the flatbed scanning apparatus.

U.S. Patent Application no. 20030202095 (2003) to Schultz discloses an optical scanner and method for 3D scanning comprising three CCD image photo-sensors mounted on a linearly-moving carriage. The carriage moving arrangement is motor driven thus the disadvantages of the conventional flatbed scanner still exist.

U.S. Pat. No. 5,276,530 (1994) to Siegel and U.S. Pat. No. 5,917,616 (1999) to Chou et al. disclose a book copying system which utilizes a height detector associated with the scan mechanism to obtain the distance between the image plane and portions of the image spaced from the image plane. Optical image data derived from scanning the original is converted to a digitized electrical image information using 1D CCD reading photo-sensor. This system comprises a moving image scanning components and reflective mirrors thus the disadvantages of the conventional flatbed scanner still exist.

U.S. Pat. No. 5,619,302 (1997) to Wu discloses an apparatus and method for scanning a bound document using a wedge shaped platen. This apparatus comprises a conventional flatbed scanner with moving scanning head. Thus the disadvantages of the conventional flatbed scanner still exist. Furthermore, this patent does not disclose using digital camera or 2D photo-sensor as a method of image capture.

U.S. Pat. No. 3,635,557 (1972) to Alderton discloses a method of presenting an image of a page of a book, so that the image may be photographically copied and apparatus for carrying out the method. The method uses a non-digital regular photographic camera which can not be digitally input to a computer for further use.

U.S. Pat. No. 3,888,584 (1975) to Smith, U.S. Pat. No. 4,415,225 (1983) to Huber et al., U.S. Pat. No. 4,585,334 (1986) to Malyon, U.S. Pat. No. 4,633,080 (1986) to Wilman et al., U.S. Pat. No. 5,953,819 (1991) to Malyon et al., U.S. Pat. No. 5,072,252 (1991) to Howsemen, Jr., U.S. Pat. No. 5,359,207 (1994) to Turner, and U.S. Pat. No. 5,526,098 (1996) to Peck et al. disclose improved document copying or scanning methods with improved angle-shaped platen design or scanning assembly for copying or scanning bound documents such as books by various methods. None of these patents discloses method or apparatus similar to the method of the present invention. The present invention having the advantages of simple design, ease of use, faster image capture and the ability to scan both opposing pages of bound documents simultaneously.

U.S. Pat. No. 4,068,950 (1978) to Kito discloses improved document copying method with improved L-shaped platen design with a generally horizontal copying top portion and a generally vertical side portion for copying bound documents such as books. The disclosed method or apparatus is claimed to copy only one page of a bound document at a time using the horizontal (top) copying portion.

U.S. Pat. No. 5,712,718 (1998) to Chen and U.S. Pat. No. 5,751,461 (1998) to Chen et al. disclose a book-edge flatbed scanner capable of scanning a thick book without any distortion at the protruding binding edge. The binding edge of the book is placed at the corner of a scanning glass window and the frame supporting the glass window so that the book can lie snugly over the window. The scanning window area is extended to the edge of the frame supporting the scanning window. The optical system and the driving mechanism lie inside the boundary of the scanning window to increase the scanning range. The scanner comprises a moving head with a 1D CCD image photo-sensor, thus the disadvantages of the conventional flatbed scanner still exist.

U.S. Pat. No. 5,801,849 (1998) to Solveychik et al. and U.S. Patent Application no. 20040218231 (2004) to Sheng et al. disclose a compact scanner the optical system of which is configured to extend in a particular direction beyond the document viewing area for improved resolution of images from a bound document adjacent the binding. The scanner comprises moving head with 1D CCD image photo-sensor, thus the disadvantages of the conventional flatbed scanner still exist.

U.S. Pat. No. 5,777,660 (1998) to Ard discloses a V-shaped scanning assembly for capturing the image of the pages of bound documents. The scanner assembly comprises a 1D CCD image capturing means in a moving assembly thus the disadvantages of the conventional flatbed scanner still exist.

U.S. Pat. No. 6,459,510 (2002) to Brewer et al. discloses a digital input scanner suitable for copying bound documents comprising a 1D CCD image capturing means in a moving assembly, thus the disadvantages of the conventional flatbed scanner still exist.

Accordingly, it is an object of the present invention to provide a digital scanning arrangement which avoids the disadvantages of the prior art.

SUMMARY OF THE INVENTION

The inventor of the present invention having experienced using convention flatbed scanners for scanning thick books was frustrated by the time required to scan the pages of a whole book which might be in the order of few days with the cost of manpower and the frequent malfunctioning of the scanner system after scanning several books. The inventor of the present invention has realized the potential benefits for using digital flash photography used in digital cameras as high-speed scanning devices for obtaining digital images in short time which may be downloaded, viewed and manipulated on a personal computer. The inventor has realized that digital cameras purchases on the high street and those intended for the individual user at home rather than just the professional can be suitably manipulated to perform a document capture function equivalent to the scanning function provided by flatbed scanners in that a digital image is captured. The inventor has realized that in order to make use of digital cameras in performing a document capture function a suitable housing must be provided which encloses and holds the camera in a steady position opposite to and preferably below the material to be imaged during document capture. To increase the versatility of the housing the inventor has included features of portability and compatibility with a range of digital cameras. Thus the present invention allows the user to improve an existing function or to perform additional functions to those originally intended by the manufacturer of the digital camera. That is, the digital camera may be used as a flatbed scanner to capture an image. In this way, a user who owns a digital camera is saved a considerable cost when comparing the typical cost of a flatbed scanning device with that of housing for supporting a digital camera to perform and equivalent document capture operation. The inventor has also realized that the present invention significantly reduces the time and cost to scan or capture an image.

One object of the specific embodiments of the present invention is to provide a housing the facilitates and supports the use of digital image capture module comprising two-dimensional photo-sensor including digital camera and digital video cameras in performing an equivalent function to a high-speed flatbed scanner in recording digital electronic images representative of opaque and transmissive objects which may be downloaded to a computer. The housing incorporates means for automatically and/or manually configuring the camera (digital image capture module) into a mode of operation for document image capture on placing said camera/module into said housing. The housing therefore allows operation of a digital camera or a digital imaging device as a desktop flatbed scanner of the type commonly used as a stand-alone computer peripheral with no moving components or drive mechanisms capable of high-speed image capture of whole test and photographic documents in one single-shot. The present invention has the advantages of simple design, ease of use, faster image capture.

Another object of the specific embodiments of the present invention is to provide a document capture housing to support at least one digital image capture module comprising at least one optical lens and at least one 2D optical image photo-sensor to obtain digital images of an object and thus perform an equivalent function to that of a conventional flatbed scanning device.

Yet another object of the specific embodiments of the present invention is to provide a document capture housing to support a 2D digital image capture module, digital camera or digital video camera to operate in a document capture mode in obtaining digital images of an object in view of the cameras optic, and thus perform an equivalent function of that of a conventional flatbed scanning device.

Yet another object of the specific embodiments of the present invention it to provide a document capture housing compatible with one or several makes and models of digital camera or digital video camera, the housing enabling the camera to be appropriately positioned below the object to be imaged and enabling the camera to be appropriately positioned below the object to be imaged and enabling focusing of said camera such that a high resolution image can be recorded.

Yet another object of the specific embodiments of the present invention it to provide a document capture housing with means to configure a 2D digital image capture module, digital camera or digital video camera supported by said housing to operate in a document capture mode in recording a high resolution digital image of an object to be imaged.

In a preferred embodiment the flatbed scanner is capable of direct (non-reflective) image capture. In another preferred embodiment the flatbed scanner has top and front (or side) platen forming 90 degree or L-shaped platen to enable sequential and/or simultaneous single-shot image capture of the opposing pages of hard to scan bound document such as books positioned thereon using either single or two digital imaging modules, digital cameras, or digital video cameras and especially at the protruding edge thus avoiding the image distortion thereat.

Therefore, an object of the present invention is to provide a high speed flatbed scanner that comprises a 2D optical photo-sensor and in particular a digital camera or digital video camera with flash light and optional (florescent) light source which combines the features of both digital camera and scanner thus having the following features and advantages over the conventional optical flatbed, rotating-drum, sheet-fed, hand held scanners:

(1) Instantaneous 2D or area capture of images instead of sequential horizontal line scanning. The image is captured with a single shot in less than 5-10 seconds (which is about the same time conventional optical scanners usually take to warm up or initialize) versus 1-2 minutes for conventional scanners. This results in significant time saving with leading savings in electrical energy, manpower, and cost. Lower time also means increased efficiency as more images may be scanned in a time-frame.

(2) High-speed, single-shot, instant image capture regardless of resolution.

(3) Energy efficient: The solid state digital imaging arrangement contains no moving parts or motor drive mechanism, thus, requiring low voltage and may be operated with low power AC adapter or a battery (which is a feature of many digital cameras) making it ultra-portable and operational through PC or laptop power.

(4) Low power consumption makes this invention environmentally friendly. Low voltage also lowers operation costs and requires no safety measure for operation-safety purposes.

(5) Can be operated as standalone peripheral or interfaced with a PC.

(6) Remote control operation, using wired or wireless remote controller which is a feature in many digital cameras, ensures contact-less and programmable image input operation.

(7) Invention may be incorporated into other devices such as multifunction imaging machines that scan, copy, fax, print, file, transmit, recognize, read, etc.

(8) Operation may be automated and enhanced using a document feeding system.

(9) Unbounded paper size, limited only by the camera resolution in mega-pixels and scanning window, which is an advantage over conventional flatbed scanners that require larger moving scanning head assembly for larger paper format with the extra cost. The scanner of the present invention can provide for larger scanning window suitable for large paper format scanning, such as A3, A2, and A1 size papers, just by increasing the size and height of the top light-transmissive platen.

(10) 2D image capture of 3D objects with no extra components or cost which is a feature available in all digital cameras but only few flatbed scanners. 3D image capture is possible both on the scanner window or in-the-air.

(11) Operates without the image reading head incorporated in conventional optical scanners which require space, slow down image capture especially when scanning at high resolution.

(12) Adjustable resolution of captured images limited only by the camera or optical image photo-sensor resolution in mega-pixels.

(13) Ultra portability due to light weight and low power consumption and especially with battery operation makes it easy to move, use and transport. This feature makes it capable of operation in any position such as scanning and capturing vertical images of hard to move or heavy objects including images on walls and ceilings for example when placed and held sideways against the wall or upside down on a table.

(14) Comprises no moving mechanical parts which ensure noiseless, trouble free and uninterrupted operation usually associated with conventional flatbed scanners thus providing better image quality and not requiring method and apparatus for securing the scanner carriage as in conventional flatbed scanners.

(15) Uses flash light from digital camera or separate illumination source such as florescent light. Using flash light saves and reduces energy cost associated with operating the light source for 1-2 minutes to capture a single image.

(16) Ideal for image capture of hard to scan objects such as bound documents such as the internal edges of thick books and the like that are inaccessible for the conventional flatbed scanners image reading head without any distortion at the protruding binding edge or causing damage to the book or the binding.

(17) Can capture the image of both opposing pages of a book or bound document sequentially and/or simultaneously.

(18) Can use any digital camera, digital video camera, or digital image capture assembly comprising a 2D optical image photo-sensor.

(19) Simple design and self contained in one assembly for easy portability and operation.

(20) Has the versatility and the features offered by many digital cameras such as low power consumption, battery operation, mobility, zoom magnification, concurrent LCD display for immediate viewing, storage of images on internal or removable memory media, easy setup, digital image editing with cameras having digital editing features, and manual, automatic or remote controlled operation.

(21) Durable solid=state motionless design reduces breakdowns and wear of complicated driving mechanism, moving mechanical assembly (parts) or reflection mirror systems used in the prior art.

It is further an object of the present invention is to provide a high speed flatbed scanner the comprises a 2D optical photo-sensor and in particular a digital camera with a flash light and optional illumination source such as florescent light that can capture the image of pages of hard to scan bound documents such as thick books and the like without any distortion at the protruding binding edge or causing damage to the book or the binding.

To achieve the above object in accordance with the present invention, there is provided a flatbed scanner comprising a top platen, bottom platen, and a plurality of side platens all of which make a housing inside which there is mounted a digital image capture device with an optic detection system including a 2D image photo-sensor, a digital camera, or a digital video camera. A light-transmitting platform (top platen) comprising the scanning window is positioned above the housing and has a top face for supporting a document to be scanned. A light source (camera flash or separate illumination source such as florescent light) is mounted to the housing for projecting a light beam toward the platform whereby the light beam transmits through the platform and is reflected by the document into the housing to be detected by the 2D optical image photo-sensor of the optic detection system within a digital image capture module such as a digital camera or a digital vide camera. The optic detection system receives the reflected light beam and converts the light beam into a corresponding electrical signal representative of the image captured. In one preferred embodiment, the top platen and at least one of the side platens and preferably the front platen are light transmissive and make an L-shaped angle on which a bound document is placed and the images of the opposing pages of which are captured from the top platen or the front platen or both platens.

BRIEF DESCRIPTION OF THE DRAWINGS

The above and other aspects, features, methods, processes and advantages of the present invention will be better and more fully understood by those skilled in the art with reference to the following detailed and more particular description of specific and preferred embodiments thereof, presented in conjunction with the following drawings to show how the same may be carried into effect, wherein:

FIG. 6 further shows a perspective view of a retaining means constructed according to one preferred embodiment of the present invention for fixedly supporting the digital camera or digital video camera using a support member with a screw that match existing threads on camera body;

DETAILED DESCRIPTION OF BEST MODE FOR CARRYING OUT THE INVENTION

Figure 1:
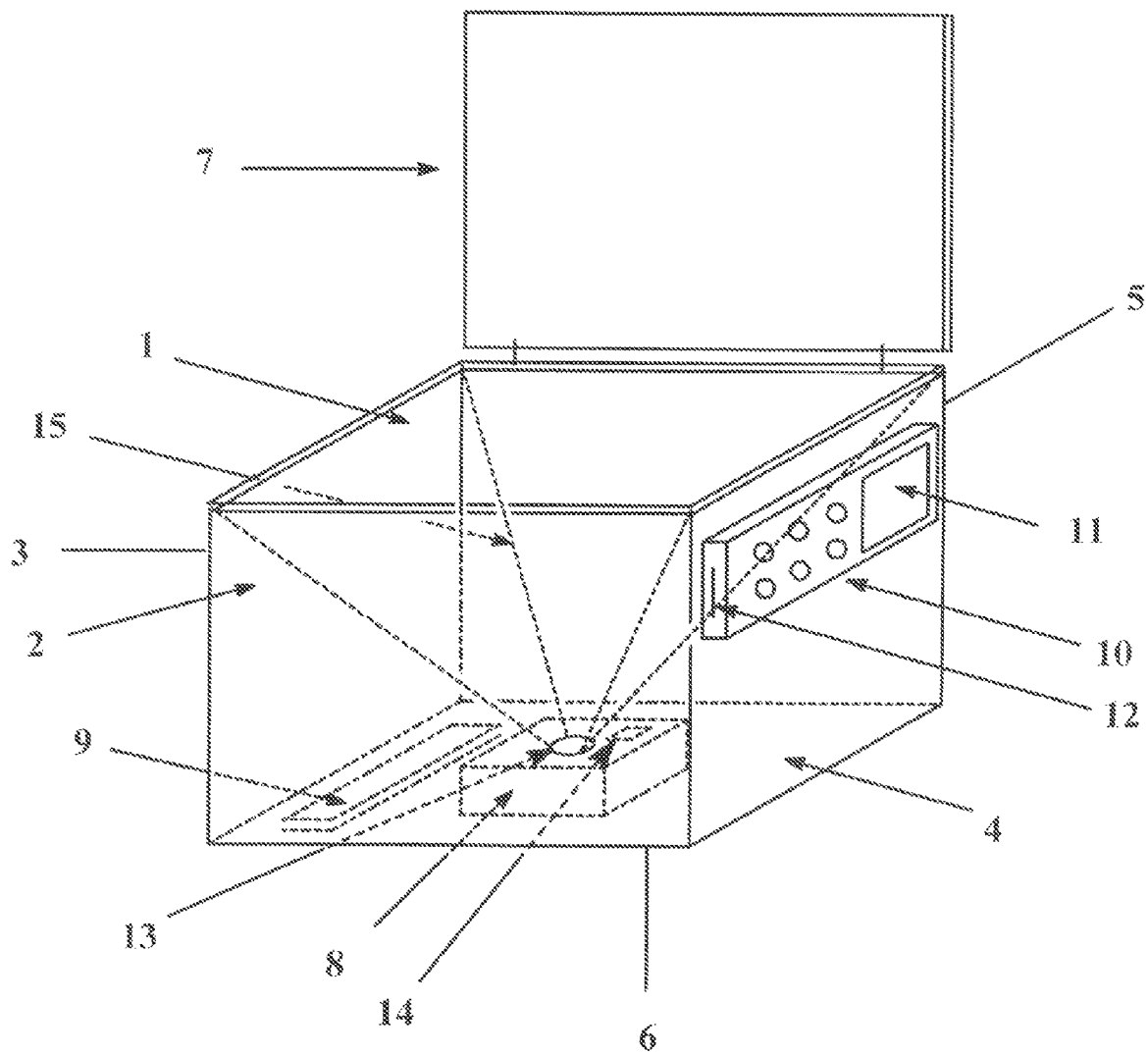
FIG. 1 is a perspective view of a flatbed scanner constructed according to a first and second embodiment of the present invention with transmissive top platen and non-transmissive front platen with the internals shown in phantom lines.

There will now be described, by way of example only, the best mode contemplated by the inventor for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Prior art digital cameras use arrays of charge coupled devices (CCD's) or complementary metal oxide semiconductor (CMOS) to receive images which may be stored electronically. This process of recording light images in an electronic manner means that the images can be recorded in a digital format. Thus, the images recorded can be downloaded to computer systems and by using appropriate software the image can be manipulated to a user's desired preference and then printed through a connected printer. Such prior art digital cameras are available to the public both in high street stores and through specialist outlets. Such prior art cameras are intended as replacements for conventional film cameras for domestic use, e.g. landscape photography, taking pictures of family and friends and the like. Although still developing, the quality and resolution provided by digital cameras is considerable. The resolution provided by such digital cameras is sufficient to accurately record a digital image of all features of, for instance, a printed page or photograph. With this in mind the inventor has realized that a digital camera may be adapted to perform a document image capture function equivalent to the scanning function performed by prior art document scanners. The inventor has further realized that any digital image capture module using optic detection system comprising a 2D photo-sensor such as those of a digital camera and digital video camera may be adapted to perform a document image capture function equivalent to the scanning function performed by prior art document scanners.

Prior art document scanners are commonly associated with personal computer systems in order to transfer information from a paper based format to a digitally recorded format which can be manipulated on screen. The inventor has realized that by adapting the use of digital image capture module with an optic detection system including a 2D image photo-sensor or a standard digital camera to perform a scanning function considerable time and expense may be avoided in that the time to capture an image of a document and download that image to a computer is significantly reduced. The inventor has further realized that by adapting the use of a standard digital camera to perform a scanning function considerable expense may be avoided in that a user need only purchase one device for recording digital images which may be used either as a portable camera or when used in conjunction with an appropriate housing subject of the present disclosure, as an image capture device suitable for document images. In order to accurately use a digital camera, or a digital image capture module with an optic detection system including a 2D image photo-sensor, to scan an object the inventor proposes a housing to locate the camera or the digital image capture module within a suitable distance from the object being imaged such that a detailed image of the object can be obtained.

In one preferred embodiment, to ease usage, such housing should lock the camera in position, activating any necessary modes of operation required to perform a document capture function. Operation of the camera to take a picture of the object being imaged may result in the image being directly downloaded to a personal computer system or other computer network by appropriately attached wires, cables, etc. Alternatively, the image may be stored in a memory means within the camera and downloaded at a later day.

In another preferred embodiment such housing should lock the digital image capture module or optic detection system comprising a 2D image photo-sensor in position, activating any necessary modes of operation required to perform a document capture function. Operation of the system/module to take a picture of the object being imaged may result in the image being directly downloaded to a personal computer system or other computer network by appropriately attached wires, cables, etc.

According to one aspect of the present invention there is provided a housing to hold a digital camera, said housing comprising: top platen, bottom platen, and plurality of side platens, wherein said housing includes camera retaining means preferably located on the base portion (bottom platen); said housing including means for configuring said camera to perform a document image capture function for capture of a digital image of a document. Preferable said means for configuring includes at least one projection in said retaining means for co-operating with a function switch of said camera. Said means for configuring further may comprise electrical connections with said camera. Preferably an action of placing said camera in said housing cases interaction of control switched on said camera with protrusions on said housing, and automatically configures said camera to zoom in or out to catch a predefined scan area, to determine a clarity and resolution of an image formed by said camera and focus the image to enable the camera to be used for performing a document capture function, equivalent to that performed by a prior art flatbed scanner device. Preferably placing said camera in said housing activates a mode of operation in said camera such that said camera automatically focuses onto a scan area at the top platen of said housing. Suitable said retaining means comprises a case adapted to receive said camera and having a plurality of apertures to enable operation of said camera. Preferable said retaining means is adapted to hold said camera in an orientation and spacing from the top platen of said housing such that said camera has a view of a san area of size and shape suitable for placement of an object which is to be the subject of a captured image by said camera. Preferably said housing includes at least one light source for projecting light to illuminate the object being scanned. The housing may include a plurality of light sources, arranged to illuminate an object plane of said camera in a manner in which light is not reflected directly back at said digital camera. Preferably a said light is activated by placing said camera into said housing. Preferable said housing further comprises viewing means to aid camera operation.

According to a second aspect of the present invention there is provided a method of capturing a digital image using a digital camera capable of performing a document image capture function comprising the steps of: fitting said camera to a housing pointed at a document which is to be the subject of a captured image; configuring said camera to operate in a document image capture mode; and operating said camera to record a digital image of said document. Preferable the method further comprises the steps of: connecting a means for downloading at least one recorded digital image to said camera; connecting said downloading means to a computer; configuring said camera to send said at least one digital image to said computer, and configuring said computer to receive said at least one digital image. Preferably said step of configuring said camera to operate in a document capture mode occurs automatically on fitting said camera to said housing by physical contact of a switch element on said camera with said housing. Said step may comprise: configuring said camera's optic to zoom in our out to capture a predefined scan area; determining the clarity and resolution of the image formed by said camera; focusing the image received by said camera. Preferably said step of configuring said camera to operate in a document capture mode occurs automatically on fitting said camera to said housing by physical contact of a switch element on said camera with said housing, said step comprising: adjusting the focal length of said camera to a predetermined length, said predetermined length being a distance between a scan area at the top of said housing and a position of an image plane of said camera when secured within said housing.

Preferable, the method further comprises the step of: operating and positioning a light source of said housing to illuminate the object being scanned. Preferable, the method further comprises the step of processing said image to optimize the image clarity and quality.

According to a third aspect of the present invention there is provided a system for capturing digital images of a document, said system comprising: a digital camera; a housing to support said camera; and a computer, wherein said housing includes at least a base platen for securing a camera retaining means for rigidly securing said digital camera in an upright orientation, said housing supporting said camera in a position suitable for operation of said camera in recording a digital image of said document. Preferably placing said camera into said housing automatically configures said camera to zoom in or out to capture a predefined scan area, to determine a clarity and resolution of image formed by said camera and to focus the image to enable said camera to be used as a scanner, capable of performing a document capture function. Preferably placing said camera into said housing activates a mode of operation in said camera such that said camera automatically focuses onto a scan area at the top of said housing. Preferably said retaining means is adapted to hold said camera in an orientation and spacing from the top of said housing such that said camera has a view of a scan area, of size and shape suitable for placement of an object which is to be the subject of a captured image by said camera. Preferably, the system further comprises means for electrically connecting said camera to said computer to enable downloading of digital images from said camera to said computer. Preferably said housing further comprises at least one light activated by placing said camera into said housing. Preferably said computer includes means for processing images captured by said camera to optimize the image clarity. Preferably said computer includes means from processing images captured by said camera to optimize the quality of monochrome images obtained using a color image photo-sensor.

Although specific embodiments of the invention provide for a multi-purpose housing suitable for enclosing a number of different types of digital camera, it is also understood that changing the retaining means for enclosing the digital camera on the housing may allow different shapes, sizes and types of digital camera to be adapted to perform a document image capture function when in conjunction with an appropriate housing.

In all aspects of the present invention said digital camera may be a digital video camera. The digital camera is detachable from said housing and usable in a stand alone context.

According to a fourth aspect of the present invention there is provided a housing to hold a digital image capture module having an optic detection system with a 2D image photo-sensor, said housing comprising: top platen, bottom platen, and plurality of side platens, wherein said digital image capture module is preferably fixedly supported on the base portion (bottom platen) of said housing; said housing including means for configuring said digital image capture module to perform a document image capture function for capture of a digital image of a document. Preferably said means for configuring includes electrical connections with said digital image capture module to zoom in or out to catch a predefined scan area, to determine a clarity and resolution of an image formed by said digital image capture module and focus the image to enable the digital image capture module to be used for performing a document capture function, equivalent to that performed by a prior art flatbed scanner device. Preferably aid digital image capture module is fixedly supported in an orientation and spacing from the top platen of said housing such that said digital image capture module has a view of a scan area of size and shape suitable for placement of an object which is to be the subject of a captured image by said digital image capture module. Preferably said housing includes at least one light source for projecting light to illuminate the object being scanned. The housing may include a plurality of light sources, arranged to illuminate an object plane of said digital image capture module in a manner in which light is not reflected directly back at said digital image capture module. Preferably a said light is activated by pressing a button or switch connected to the digital image capture module. Preferably said housing further comprises viewing means to aid said digital image capture module operation.

According to a fifth aspect of the present invention there is provided a method of capturing a digital image using a digital image capture module having an optic detection system with a 2D image photo-sensor, comprising the steps of: fitting said digital image capture module to a housing pointed at a document which is to be the subject of a captured image; configuring said digital image capture module to operate in a document image capture mode; and operating said digital image capture module to record a digital image of said document. Preferably the method further comprises the steps of: connecting a means for downloading at least one recorded digital image to said digital image capture module; connecting said downloading means to a computer; configuring said digital image capture module to send said at least one digital image to said computer, and configuring said computer to receive said at least one digital image. Preferably said step for configuring said digital image capture module further includes software algorithms and electronic hardware to automatically configure said digital image capture module. Said step may comprise: configuring said digital image capture module's optic to zoom in or out to capture a predefined scan area; determining the clarity and resolution of the image formed by said digital image capture module; focusing the image received by said digital image capture module. Preferably said step of configuring said digital image capture module to operate in a document capture mode occurs by pressing a button or switch connected to the digital image capture module, by remote control, or by a remote host computer, said step comprising: adjusting the focal length of said digital image capture module to a predetermined length, said predetermined length being a distance between a scan area at the top of said housing and a position of an image plane of said digital image capture module secured within said housing. Preferably, the method further comprises the step of: operating and positioning a light source on said housing to illuminate the object being scanned. Preferably, the method further comprises the step of processing said image to optimize the image clarity and quality.

According to a sixth aspect of the present invention there is provided a system for capturing digital images of a document, said system comprising: a digital image capture module; a housing to support said digital image capture module; and a computer, wherein said housing includes at least a base platen for securing a digital-image-capture-module retaining means for rigidly securing said digital image capture module in an upright orientation, said housing supporting said digital image capture module in a position suitable for operation of said digital image capture module in recording a digital image of said document. Preferably by pressing a button or switch connected to the digital image capture module, on a remote control, or on a remote host computer configures said digital image capture module to zoom in our out to capture a predefined scan area, to determine a clarity and resolution of image formed by said digital image capture module and to focus the image to enable said digital image capture module to be used as a scanner, capable of performing a document capture function. Preferably by pressing a button or switch connected to the digital image capture module, on a remote control, or on a remote host computer activates a mode of operation in said digital image capture such that said digital image capture automatically focuses onto a scan area at the top of said housing. Preferably said retaining means is adapted to hold said digital image capture module in an orientation and spacing from the top of said housing such that said digital image capture module has a view of a scan area, of size and shape suitable for placement of an object which is to be the subject of a captured image by said module. Preferably, the system further comprises means for electrically connecting said digital image capture module to said computer to enable downloading of digital images from said digital image capture module to said computer. Preferably said housing further comprises at least one light activated by pressing a button or switch connected to the digital image capture module. Preferably said computer includes means for processing images captured by said digital image capture module to optimize the image clarity. Preferably said computer includes means for processing images captured by said digital image capture module to optimize the quality of monochrome images obtained using a color image photo-sensor.

In all aspects of the present invention said image capture module may be any digital image capture device or optic detection system comprising a 2D image photo-sensor such as a digital camera or a digital video camera.

DESCRIPTION OF PREFERRED EMBODIMENTS

The above and other aspects, features, and advantages of the present invention will be better and more fully understood by reference to the following detailed and more particular description of the invention, presented in conjunction with the following examples which are provided to further define the invention and are in no way meant to limit the scope of the invention to the particulars of these examples, wherein:

Example 1

Using Digital Image Capture Module

One embodiment of the present invention will be described in detail be referring to the accompanying drawings and in particular to FIG. 5, a flatbed scanner constructed in accordance with the present invention comprises a top platen 1, front platen 2, two side platens 3 and 4, a rear platen 5, and a bottom platen 6, all of which constitute a housing or an enclosure. At least the top platen 1 which is the scanning window is a transparent or light-transmitting platform on which a document to be scanned (not shown) is positioned. The top platen 1 is positioned at the top and supported on the housing. The scanning window area is extended to the edge of the thin frame supporting the scanning windows to provide enough scanning glass room making it easier to scan or capture the images of hard to scan bound documents having small margins such as thick books for example especially near the binding edge without any distortion at the protruding binding edge or causing damage to the book or binding. The binding edge of the book is placed at the corner of the scanning glass window and the frame supporting the glass window and preferably at the corner of a top platen 1 and the front platen 2, so that the book can lie snugly over the window. An illumination source comprising a light emitting diode (LED) 9 or a flash light 14 is mounted inside the housing onto the bottom platen 6 next to the digital image capture module thereby minimizing variations in lighting conditions due to variation of the scan carriage, and generates a light, such as a white light, transmitting and projecting a light beam through the casing toward the platform 1. The source of light which may be an electronic flashlight 14 in the course of photographing or LED 9 or both is biased towards vertical orientation for projecting the light towards the document for image capture. The LED light 9 might be a switchable (on/off) constant light or might be a flash light source both of which may be operated manually or automatically in the course of photographing a document. The light beam is eventually transmitted and projected through the top platen 1 to the document to be scanned positioned on the top platen 1 (platform). The light beam is then reflected by the document positioned on the platform as indicated by reference numeral 15 and induces an optic signal that represents patterns formed on the document. The casing may optionally have a reflective inside surface. The reflected light beam goes into the housing and toward a photoelectric system comprising a digital image capturing module comprising a photo-sensor 18 and an optical lens 19 (FIG. 5) and further, the lens 19 is set before the photo-sensor 18 to receive and focus the reflective light beam via the light entrance of the image-capturing module onto the photo-sensor 18, such as an area (2D) image photo-sensor such as CCD or CMOS, whereby the optic signal contained in the light beam is converted into corresponding electrical signal (charges) forming electronic image data which is a digitized representation of the original image on the document. The electrical signals are passed to a digital converter (not shown), which converts the electrical signals into digital output signals representative of the image scanned by the digital image capture module. The electrical signal is stored in an image buffer for further processing. Alternatively, the electrical signal is directly output by the host interface. Those of ordinary skill will readily recognize that the photoelectric array and the digital converter can be separate discrete components, or can form part of a single integrated electronic assembly. The digital image capture module is pivotally mounted to the said housing and is biased toward a vertical orientation inside said housing by gravity. The digital image capture module is preferably mounted on the scanner base portion but is also optically and/or physically coupled to the support assembly. The 2D photo-sensor 18 comprises in the digital image capture module is mounted to and in electrical connection with a circuit board (not shown) that forms a control circuit comprising a scanned control chip and image processing algorithms for receiving and processing the electrical signal. The optical lens 19, 2D image photo-sensor 18, circuit board (not shown) and control circuit (not shown), scanner control chip, and image processing algorithms may all be substituted by any digital imaging device such as a digital camera 8 or digital video camera. A retaining manes is provided to hold to the digital imaging module in position. The document to be scanned is held down snuggly to the scanning window (top platen 1) by a detachable scanning window cover 7.

Figure 5:
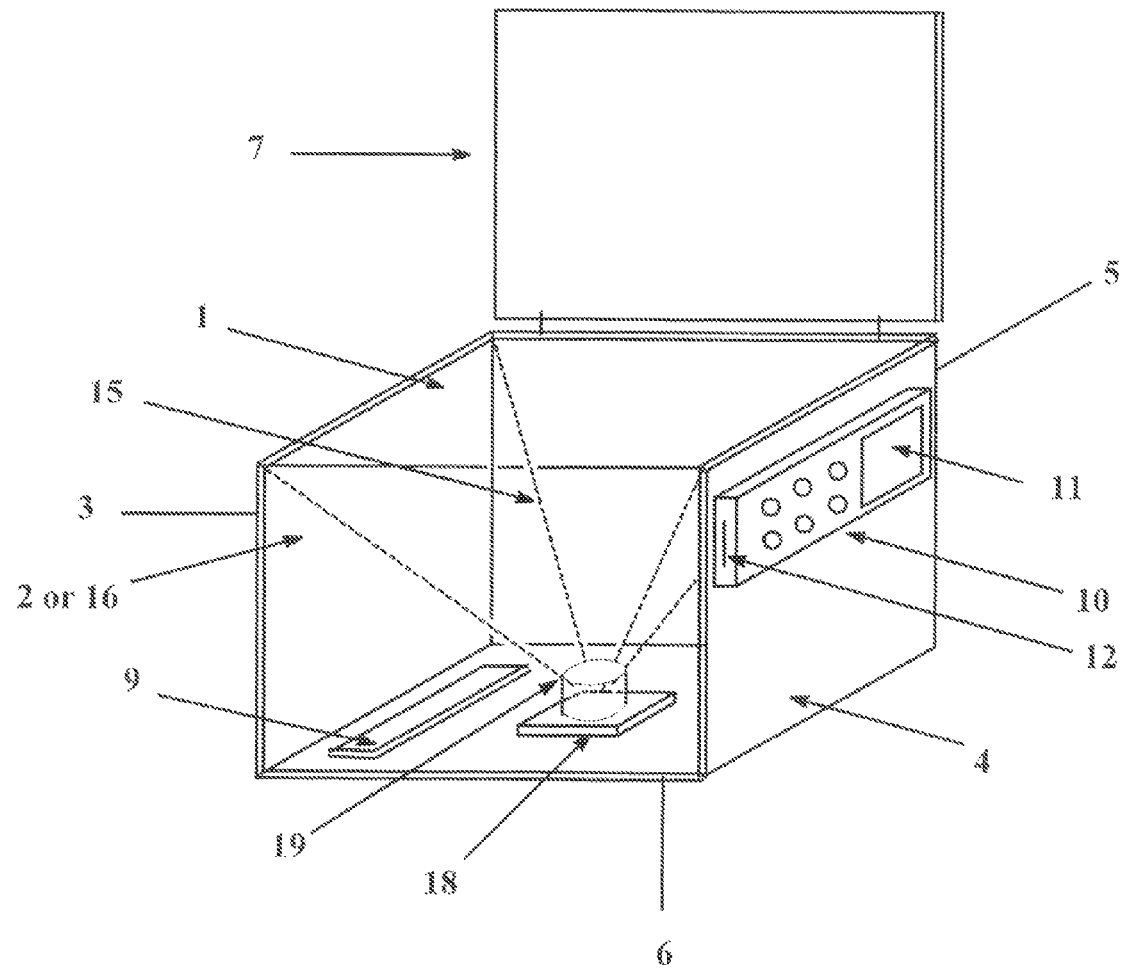
FIG. 5 is a perspective view of a flatbed scanner constructed according to a first embodiment of the present invention with a digital image capture module comprising at least one 2D optical photo-sensor and at least one focal lens for converting the focused light beam reflected from document to be scanned into an electric image signal.

In a preferred embodiment of the present invention described herein with reference to the drawings and in particular to FIG. 5, a flatbed scanner constructed in accordance with the present invention wherein the digital image capture module is a system comprising a 2D optical image photo-sensor 18 with optical lens 19, a control circuit and circuit board (not shown) assembled and operated in the same manner of a digital camera instead of the digital camera. The 2D optical image photo-sensor is selected from at least one of a plurality of optical photo-sensors, the plurality of optical photo-sensors comprising: a charge couple device (CCD), a charge injection device (CID), an optical complementary metal oxide semiconductor (CMOS) array, an optical bipolar junction transistor (BJT) array, a photogate array, or a photo-diode array with the preferred one being a charge coupled device (CCD).

To obtain the image of a document or a bound document, such as a book 24 (FIG. 3), having an original image to be scanned on a face of the document, for this embodiment, the document face is placed down and pressed down flat into intimate contact with the scanning window or top platen 1 that mounts on the top of the scanner housing. The binding edge of the book is placed at the corner of a scanning glass window and the frame supporting the glass window so that the book can lie snugly over the window. Image capture is effected by pressing a button connected to the digital image capture module and preferably said button is located onto the housing from the outside and more preferably onto the scanner side control panel. Pressing said button activates the LED or flash light and the shutter on the image capture module thereby capturing the image of the document in a single shot which may be stored in the scanners internal memory, removable memory media, or transferred to a host such as a computer or a computer peripheral such as a printer, fax, etc.

The platform 1 is made of highly light-transmissive material to allow the light beam from the light source to transmit there through thereby allowing the document to be scanned with respect to the light source to allow completely scanning of the document. In one preferred embodiment, the top platen 1 or scanning window is preferably made of glass or other transparent (light emitting) surface like plastic to place and capture the image of a document on top of or through.

In one preferred embodiment the flatbed scanner transmissive top platen 1 is biased toward horizontal orientation above said housing for document, and bid document, image capture, and can be supplied with automatic paper sheet feeder for fast scan of large number of papers.

For color applications, the light source may comprise a white light LED 9 mounted to the bottom platen 6 inside the scanner housing and photo detector 18 may comprise a 2D optical image photo-sensor such as a charge coupling device that is capable to handle color signal. Alternatively, the light source may comprise three LEDs (not shown) respectively associated with red light, green light and blue light. The LEDs are mounted to the bottom platen 6 inside the scanner housing.

In a preferred embodiment, a flatbed scanner constructed in accordance with the present invention wherein sideway control panel 10 for easy setup, control, configuration, and operation of the digital image capture module, in upright, sideways, upturned scanning positions of the flatbed scanner. The control panel 10 may optionally comprise a display 11 such as an LCD or other form of display to function as an extended view finder to facilitate the instantaneous view on an object to be scanned, to aid use of the digital image capture module in obtaining a suitable image, and a removable memory storage media drive 12 for memory media image storage such as memory stick.

In a preferred embodiment of the present invention the flatbed scanner housing comprises a side panel 10 for side panel operation to configure and control the digital image capture module through said panel 10, among many possible functions, to capture images in color, grayscale, or black and while modes; set the desired resolution; set image destination either to storage, fax, print, etc.; switch LED 9 on/off, zoom in or out to catch a predefined scan area, set aperture, shutter speed, flash illumination, white balance and image sharpening, and furthermore said side panel 10 preferably comprises a display such as for example LCD display 11 to view the image before and/or after scanning and a memory media drive for removable or non-removable memory media storage of captured images.

Figure 8:
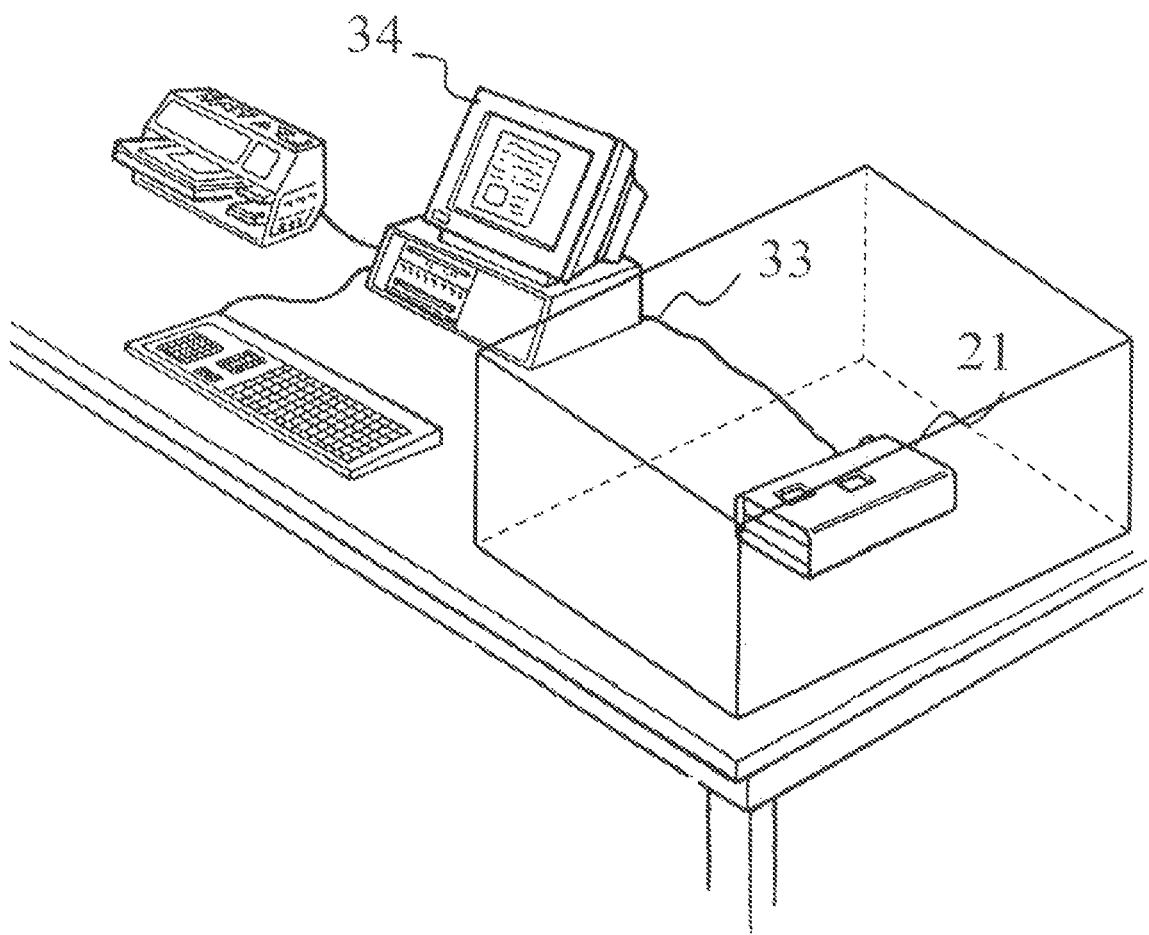
FIG. 8 illustrates a system constructed according to a fifth embodiment of the present invention, suitable for using a digital camera within retaining means inside a scanner housing for document capture and downloading of the image obtained to a personal computer where the image may be refined or amended and may further be printed or used in an electronic form of communication.

Also referring to FIGS. 1 through 6, the flatbed scanner of the present invention can be operated in several modes as a standalone peripheral or interfaced with a host PC (FIG. 8). In one embodiment, the flatbed scanner of the present invention is operated in standalone mode wherein desired settings are inputted directly to the digital image capture module or to the scanners side panel 10 connected to the digital image capture module, the image is stored in an internal memory or removable memory media for later use, and viewed by the scanner LCD 11 or other kind of display (for instant viewing of scanned image which is better than the preview mode in the scanner which requires interface with PC). In another embodiment, the flatbed scanner of the present invention is operated in host interface mode such that a host interface (801) like a personal computer (PC) for example to which the flatbed scanner is connected activates power of the flatbed scanner to supply power from AC to DC power source to the digital image capture device and light source. To carry out an image capture operation, the host interface issues a signal to the scanner control chip (not shown) which controls the image capture device and actuates the LED 9 light source to emit a light beam. The desired settings are adjusted from PC panel where the image capture may be initiated. The captured image may be displayed on the PC display, stored on a computer memory, or edited using commercially available graphical editing software installed on that PC. In yet another embodiment, the flatbed scanner of the present invention is operated in combined mode wherein any combination of the above modes is possible for example, settings may be made o the scanner housing side control panel and image is captured with one push of a button on the side panel 10, and stored in scanner internal or removable memory, then manually or automatically transferred to PC display or memory for further use. Output may also be directed manually or automatically to other devices such as fax machine, copier, printer, or multi-function device, and the like.

Example 2

Using Digital Camera or Digital Video Camera

A second embodiment of the present invention will be described in detail by referring to the accompanying drawings and in particular to FIG. 1, a flatbed scanner constructed in accordance with the present invention comprises a top platen 1, front platen 2, two side platens 3 and 4, a rear platen 5, and a bottom platen 6, all of which constitute a housing or an enclosure. At least the top platen 1 which is the scanning window is a transparent or light-transmitting platform on which a document (not shown) to be scanned is positioned. The top platen 1 is positioned at the top and supported on the housing. The scanning window area is extended to the edge of the thin frame supporting the scanning windows to provide enough scanning glass room making it easier to scan or capture the images of hard to scan bound documents having small margins such as thick books for example especially near the binding edge without any distortion at the protruding binding edge or causing damage to the book or binding. The binding edge of the book is placed at the corner of a scanning glass window and the frame supporting the glass window (the corner of a top platen 1 and the front platen 2) so that the book can lie snugly over the window. An illumination source comprising an electronic flash light mounted inside the housing or on the digital camera 14 or a light emitting diode (LED) 9 mounted inside the housing onto the bottom platen 6 next to the digital camera thereby minimizing variations in lighting conditions due to vibration of the scan carriage, and generates a light, such as a white light, transmitting and projecting a light beam through the casing toward the platform 1. The source of light which may be flashlight 14 in the course of photographing or LED 9 or both is biased towards vertical orientation for projecting the light towards the document for image capture. The LED light 9 might be a switchable (on/off) constant light or might be a flash light source both of which may be operated manually or automatically in the course of photographing a document. The light beam is eventually transmitted and projected through the top platen 1 to the document to be scanned positioned on the top platen 1 (platform). The light beam is then reflected by the document positioned on the platform as indicated by reference number 15 and induces an optic signal that represents patterns formed on the document. The casing may optionally have a reflective inside surface. The reflected light beam goes into the housing and toward the lens 13 of a digital camera 8 to receive and focus the reflective light beam via the light entrance of the digital camera whereby the optic signal contained in the light beam is converted into corresponding electronic image data which is a digitized representation of the original image on the document. The electrical signal is stored in an image buffer for further processing. Alternatively, the electrical signal is directly output by the host interface. The digital camera is pivotally mounted to the said housing and is biased toward a vertical orientation inside said housing by gravity. The digital camera is preferably mounted on the scanner base portion but is also optically and/or physically coupled to the support assembly comprising a retaining means which is provided to hold the digital camera in position. The document to be scanned is held down snuggly to the scanning window (top platen 1) by a detachable scanning window cover 7.

To obtain the image of a document or a bound document, such as a book 24 (FIG. 3), having an original image to be scanned on a face of the document, for this embodiment, the document face is placed down and pressed down flat into intimate contact with the scanning window or top platen 1 that mounts on a top of the scanner housing. The binding edge of the book is placed at the corner of a scanning glass window and the frame supporting the glass window so that the book can lie snugly over the window. Image capture is affected by pressing the image capture button located on the camera or onto the housing from the outside and more preferably onto the scanner side control panel. Pressing said button activates the camera to capture the image of the document in a single shot which may be stored in the cameras internal memory, removable memory media, or transferred to a host such as a computer or a computer peripheral such as a printer, fax, etc.

The platform 1 is made of highly light-transmissive material to allow the light beam from the light source to transmit therethrough thereby allowing the document to be scanned with respect to the light source to allow completely scanning of the document. In one preferred embodiment, the top platen 1 or scanning window is preferably made of glass or other transparent (light emitting) surface like plastic to place and capture the image of a document on top of or through.

In one preferred embodiment the flatbed scanner transmissive top platen 1 is biased toward horizontal orientation above said housing for document, and bind document, image capture, and can be supplied with automatic paper sheet feeder for fast scan of large number of papers.

For color applications, the light source may comprise a white light LED 9 mounted to the bottom platen 6 inside the scanner housing. Alternatively, the light source may comprise three LEDs (not shown) respectively associated with red light, green light and blue light. The LEDs are mounted to the bottom platen 6 inside the scanner housing.

In a preferred embodiment, a flatbed scanner constructed in accordance with the present invention wherein sideway control panel 10 for easy setup, control, configuration, and operation of the digital camera in upright, sideways, and upturned scanning positions of the flatbed scanner. The control panel 10 may optionally comprise a display 11 such as an LCD or other form of display to function as an extended view finder to facilitate the instantaneous view on an object to be scanned, to aid use of the digital camera in obtaining a suitable image, and a removable memory storage media drive 12 for memory media image storage such as a memory stick.

In a referred embodiment of the present invention the flatbed scanner housing comprises a side panel 10 for side panel operation to configure and control the digital camera 8 through said side panel 10, among many possible functions, to capture images in color, grayscale, or black and white modes; set the desired resolution; set image destination either to storage, fax, print, etc.; switch LED 9 on/off, zoom in or out to catch a predefined scan area, set aperture, shutter speed, flash illumination, white balance and image sharpening, and furthermore said side panel 10 preferably comprises a display such as for example LCD display 11 to view the image before and/or after scanning and a memory media drive for removable or non-removable memory media storage of captured images.

Also referring to FIGS. 1 through 6, the flatbed scanner of the present invention can be operated in several modes as a standalone peripheral or interfaced with a host PC (FIG. 8). In one embodiment, the flatbed scanner of the present invention is operated in standalone mode wherein desired settings are inputted directly to the camera or to the scanners side panel 10 connected to the camera, the image is stored in the digital camera internal memory or removable memory media for later use, and viewed by the digital camera LCD 703 or scanner LCD 11 or other kind of display (for instant viewing of scanned image which is better than the preview mode in the scanner which requires interface with PC), and edited digitally with cameras having digital editing features. In another embodiment the flatbed scanner of the present invention is operated in host interface mode such that a host interface (not shown) like a personal computer (PC) for example to which the flatbed scanner is connected activates power of the flatbed scanner to supply power from AC or DC power source to the image capture device and light source. To carry out an image capture operation, the host interface issues a signal to the digital camera and actuates the LED light 9 source or the camera flash light to emit a light beam. The desired settings are adjusted from PC panel where the image capture may be initiated. The captured image may be displayed on the PC display, stored on computer memory, or edited using commercially available graphical editing software installed on that PC. In yet another embodiment, the flatbed scanner of the present invention is operated in combined mode wherein any combination of the above modes is possible, for example, settings may be made on camera and image is captured with one push of a button on the camera, and stored in camera memory, then manually or automatically transferred to PC display or memory for further use. Output may also be directed manually or automatically to other devices such as fax machine, copier, printer, or multifunction device, and the like.

Example 3

Flatbed Scanner for Bound Documents

In a third embodiment of the present invention described herein with reference to the drawings and in particular to FIGS. 2 through 6, a flatbed scanner suitable for copying bound documents is constructed in accordance with the present invention as shown in Examples 1 and 2 wherein at least both the top platen 1 and the front platen 16 are transparent or light transmissive and both form an L-shaped angle there between. The top platen 1 and front platen 16 make up the L-shaped scanning window and are positioned to support the opposing faces of a bound document during use. The edge, where both the top platen 1 and front platen 16 meet, is small enough so as to provide enough scanning glass room making it easy to scan bound documents such as thick books for example especially near the binding edge without any distortion at the protruding binding edge or causing damage to the binding. The binding edge of the book is placed at the corner of a top platen 1 and the front platen 16, both of which are forming the L-shaped scanning window, so that the book can lie snugly over both windows. The image capture range is extended to the edge of the L-shaped angle between the two scanning windows to completely cover the scanning window (top platen 1 and front platen 16) area.

Figure 3:
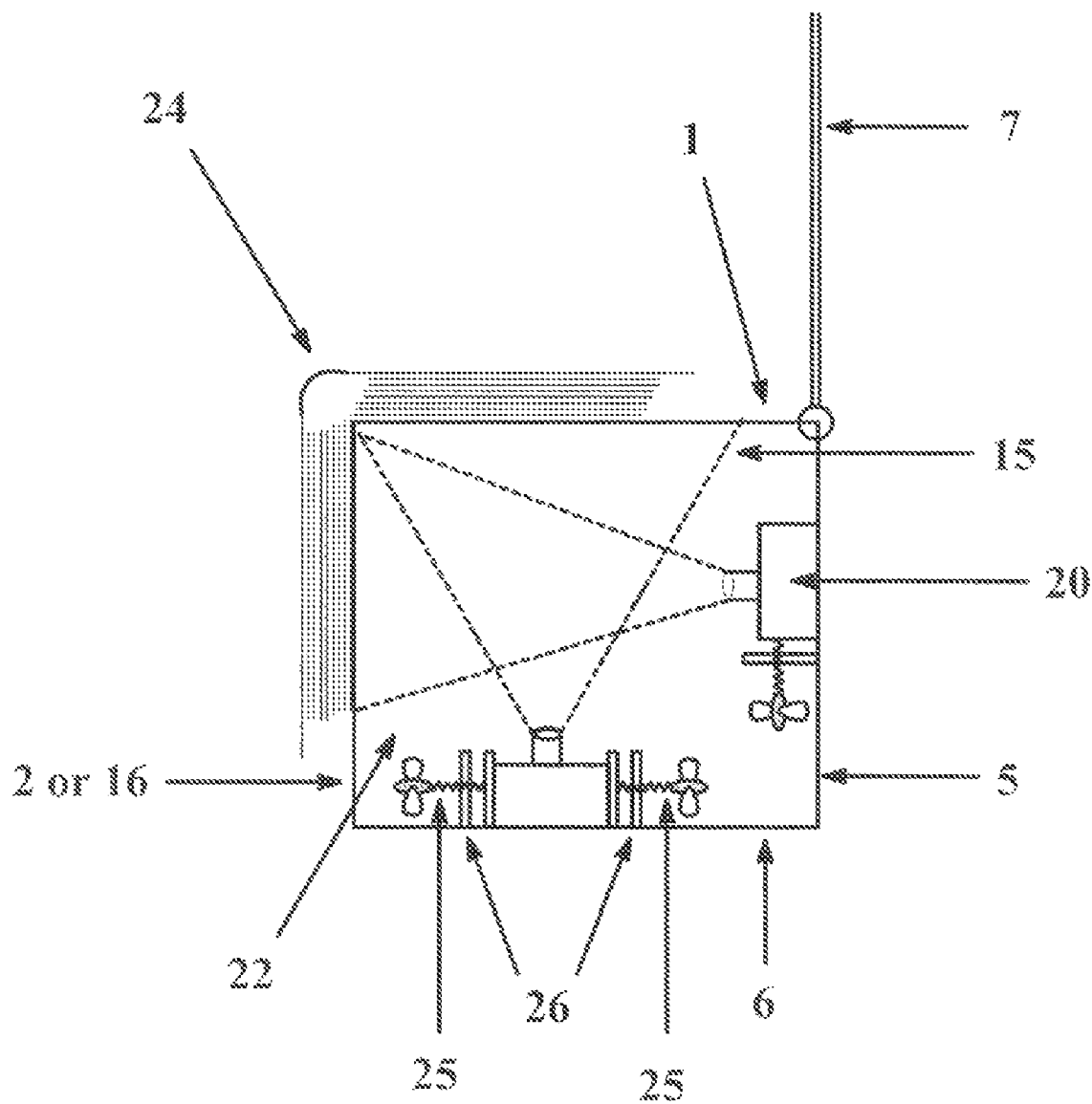
FIG. 3 is a representative view of a flatbed scanner constructed according to a third embodiment of the present invention comprising dual digital image capture modules or digital cameras located within the scanner housing for direct (non-reflective) simultaneous top-view and front-view image capture of bound documents such as thick books.
Figure 4:
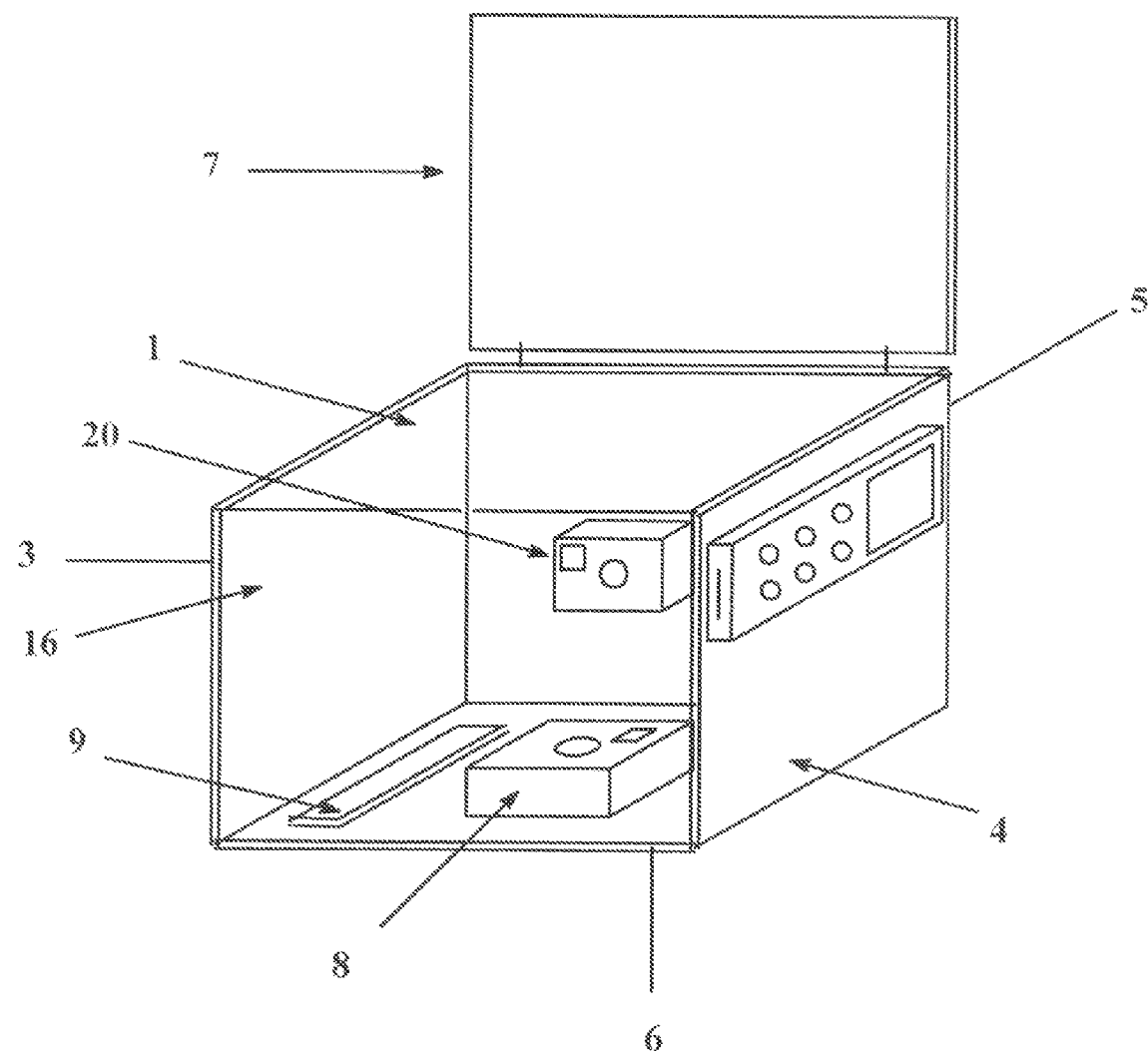
FIG. 4 is a perspective view of a flatbed scanner constructed according to a second embodiment of the present invention with two camera arrangement for simultaneous two-side image capture (top and front platen) to facilitate fast image capture of the opposing sides of the pages of bound documents such as thick books.

In a preferred embodiment of the present invention described herein with reference to the drawings and in particular to FIGS. 3 and 4, a flatbed scanner is constructed in accordance with the present invention with a dual camera or a dual digital image module, wherein both top platen 1 and front platen 16 are transparent or light transmissive and a second digital camera 20 (or second 2D digital imaging module) is provided and mounted within the housing onto the rear platen, or any side platen that is facing about the transmissive side platen, for simultaneous side capture of images from second page of a bound document through transmissive front platen 2 or a platen facing the direction of the second digital camera (or second 2D digital imaging module).

In a preferred embodiment the flatbed scanner transmissive top platen 1 is biased toward a horizontal orientation above said housing and the transmissive side platen 16 is biased toward a vertical orientation at the side of said housing for bind document scan or image capture. In another preferred embodiment, the front platen 16 (front scanning window) is made of glass or other transparent (light emitting) surface like plastic for front and/or side scanning of bound documents such as books.

To obtain the image of the opposing pages of a bound document, such as a book 24 (FIG. 3), having an original image to be scanned on a face of the document, for this embodiment, the documents face of the opposing pages preferably pressed snuggly in contact with the glass platens 1 and 16 on top and front of the scanner housing. The binding edge of the book is placed at the corner of L-shaped scanning glass windows so that the book can lie snugly over the two windows. Image capture is affected by pressing a button connected to the two digital image capture modules or digital cameras and preferably said button is located onto the housing from the outside and more preferably onto the scanner side control panel. Pressing said button activates the two digital camera or image capture modules to simultaneously capture the image of the two opposing pages of the book in single shows which may be stored in the scanners internal memory, removable memory media, or transferred to a host such as a computer or a computer peripheral such as a printer, fax, etc.

Figure 2:
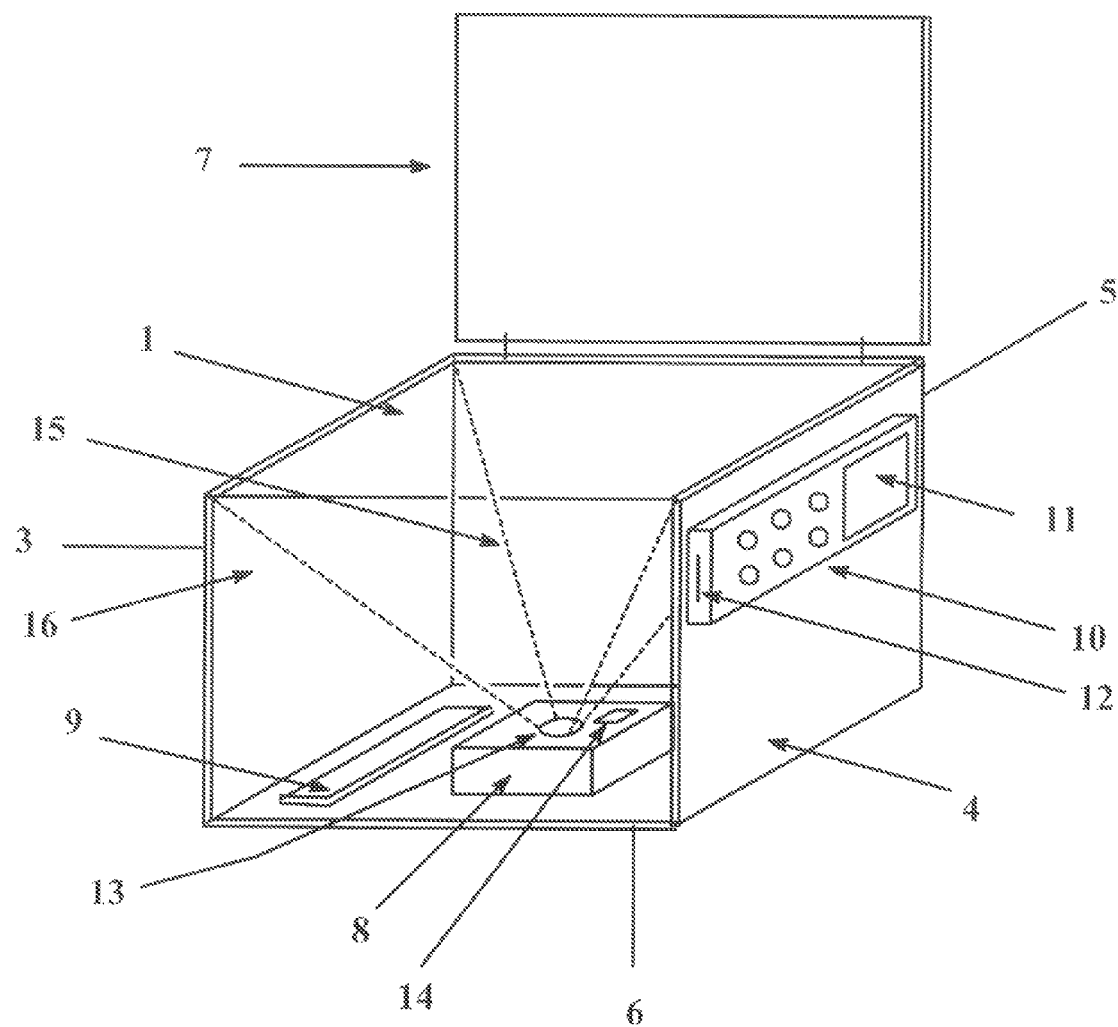
FIG. 2 is a perspective view of a flatbed scanner constructed according to a second embodiment of the present invention with image capture field shown with phantom lines.
Figure 6:
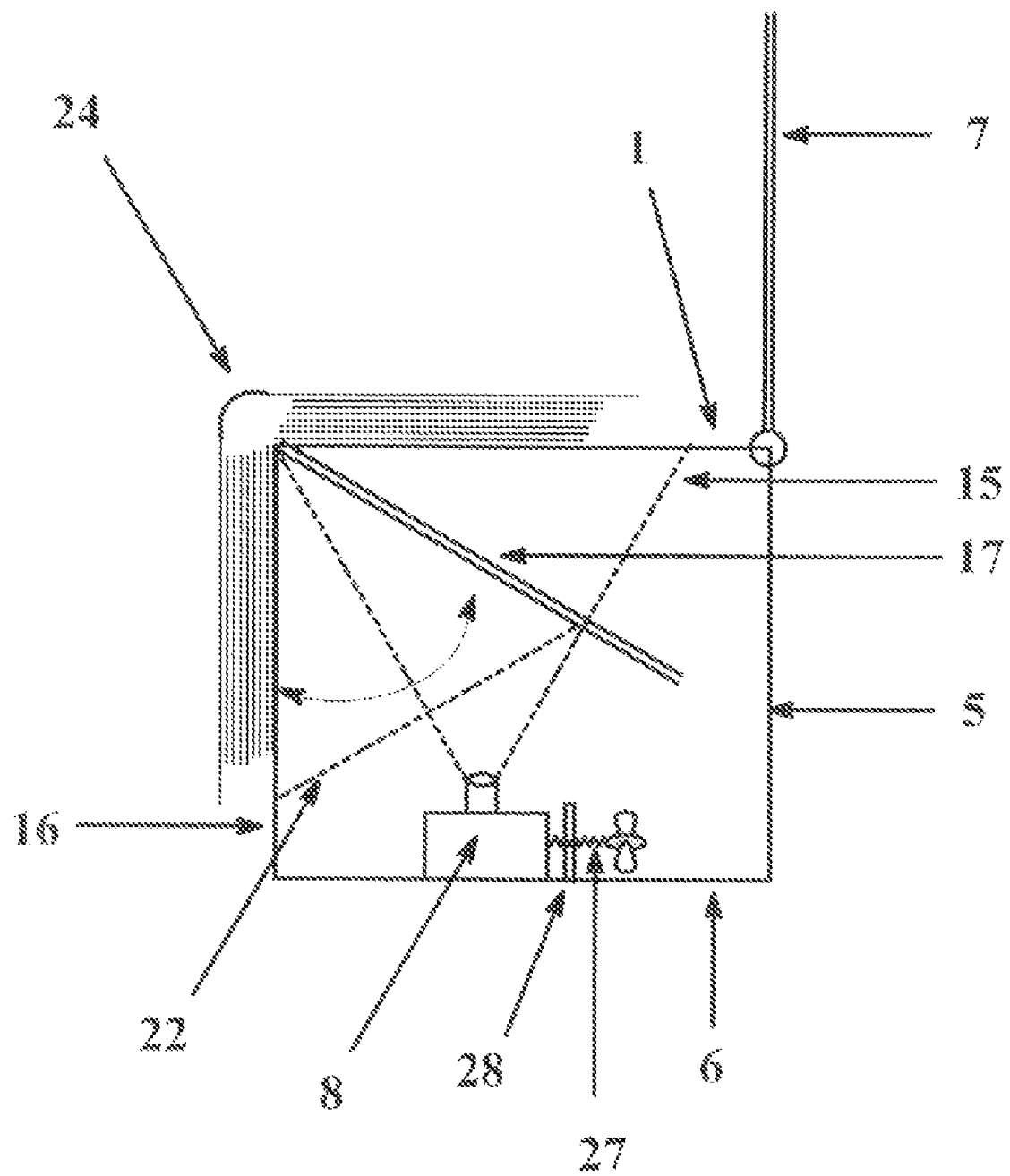
FIG. 6 is a representative view of a flatbed scanner constructed according to a fourth embodiment of the present invention comprising a moveable mirror placed diagonally within the scanner housing for front-view image capture using single (top-view) image capture arrangement which is ideal for sequential image capture of bound documents such as thick books.

In a fourth embodiment of the present invention described herein with reference to the drawings and in particular to FIGS. 2 and 6, a flatbed scanner is constructed in accordance with the present invention with a single camera or a single 2D digital image photo-sensor design wherein an internal moving reflective surface or mirror 17 is provided for sequential front image capture of the second page of a book, with the first page of the book being directly captured through the same camera without a reflective mirror through the top transmissive platen. The reflective surface can be slid vertical and at an angle judged judicially to be 45-degrees for alternate top and front image capture using single digital camera design. The mirror 17 is diagonally placed at an angle of 45-degrees within the flatbed scanner housing, so as to make the layout of optical path and light path form a 90-degrees angle about the face of the camera or digital image photo-sensor module where the image-capturing module or digital camera is located, wherein the mirror 17 is a single-faced mirror, wherein the reflective side of the mirror 17 fronts with a 45-degree angle both the light inlet (not shown) to reflect an incident light 22 into the front transparent platen 16 of the housing, and the digital image-capturing module or camera to reflect the light thus the image to the camera lens 13 or digital image capture module lens 19.

To obtain the image of the opposing pages of a bound document, such as a book 24 (FIG. 6), having an original image to be scanned on a face of the document, for this embodiment, the documents face of the opposing pages preferably pressed snuggly in contact with the glass platens 1 and 16 on top and front of the scanner housing. The binding edge of the book is placed at the corner of L-shaped scanning glass windows so that the book can lie snugly over the two windows. Image capture is effected by pressing a button connected to the digital image capture module or digital camera and preferably said button is located onto the housing from the outside and more preferably onto the scanner side control panel. Pressing said button activates the digital camera or image capture modules to capture the image reflection 15 of the page placed on the top platen 1 (or top scanning window) in a single shot, when the mirror is moved and placed vertically in contact with the front platen 16. Pressing said button again activates the digital camera or image capture module to capture the mirror image reflection 22 of the second page of the book placed in intimate contact with the front platen 16 (or front scanning window) in a single shot, when the mirror is moved and placed at an angle judged judicially to be 45-degrees. The captured image may be stored in the scanners internal memory, removable memory media, or transferred to a host such as a computer or a computer peripheral such as a printer, fax, etc. Mirror movement is effected manually through a handle (not shown) connected to said mirror and projects outside the scanner housing through appropriate opening on a side platen.

For the purposes of the present invention, the transmissive side platen making L-shaped angle with the top platen 1 may be any of the side platens including the front platen 16, side platen 3 or side platen 4 and form the scanning window.

Example 4

Retaining Means

In the first preferred specific embodiment with referring to FIG. 6 herein, there is provided a flatbed scanner with a means to balance and support the document capture device or digital camera in a stable position in order that it may be operated to record digital images of documents of such a quality to be equivalent to that obtained by commonly known scanning units. At the base of said housing there is provided a retaining means. Said retaining means fixedly supports and locks in position the digital camera in a vertically upright position enabling the digital camera to be located in a retaining means for operation as a document capture unit to be used in obtaining digital images. Said retaining means may exist in one of a number of forms. In a simplistic format, said retaining means may exist as a screw tightening support mechanism locating with an appropriate thread on the digital camera to be used. The screw tightening support mechanism comprises a support member 18 and a screw 27. The screw 27 is screwed into and tightened with an appropriate thread usually located on the digital camera which is a standard feature of all cameras. USB cable which is now a standard feature available in all digital cameras is used to connect the digital camera or digital video camera to a host computer or other peripherals. Wireless signals such as Bluetooth or WiFi are also becoming standard digital cameras to connect the digital camera to a personal computer or other peripherals.

Referring to FIG. 1 herein, there is illustrated a housing according to a first preferred specific embodiment of the present invention, enclosing a digital camera in performing a document image capture function. The digital camera may comprise a photographic camera suitable for taking still images, or a video camera. At a base portion (bottom platen 6) there exists a retaining means configured to enclose a digital camera comprising a clamping means (FIG. 3). Said clamping means is secured using a screw fastening means 25. Tightening the screw fastening means 25 results in two planar plates attached to support member 26 appropriately located on the two sides of the digital camera and to be urged together and thus securely grip the camera. In this way the camera is firmly held in position rigid within the housing, such that the digital camera can be located in the retaining means such that it will remain substantially stationary facilitating operation of the camera in obtaining an image of an object to be imaged 24. Retaining means is located on the bottom platen 6 and is adjustable along the bottom platen 6.

Figure 7:
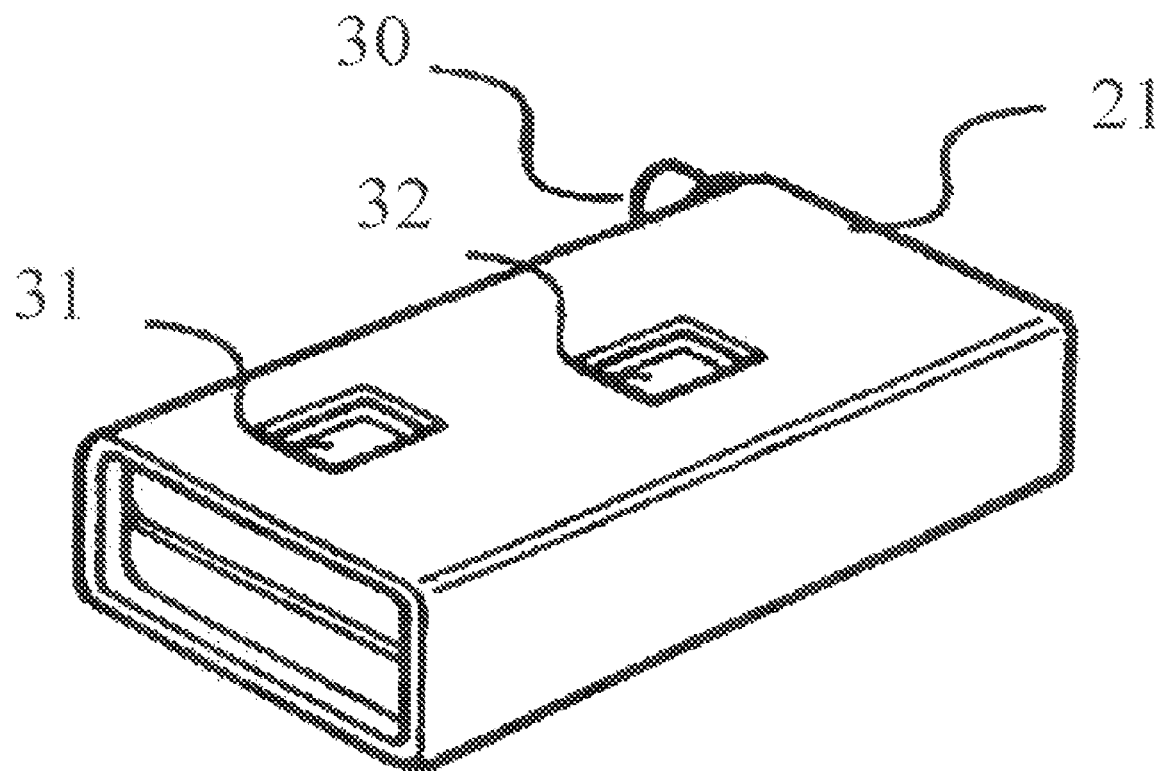
FIG. 7 illustrates one form of retaining means including suitable apertures, abutments/projections and buttons for use in configuring and operating the digital camera during document capture.

Retaining means may further comprise a case or boxed housing (FIG. 7) in which a suitable digital camera can be placed by either sliding said camera into the retaining means 21 from one side or from above or below. This may be facilitated by suitable hinge sections within the retaining means forming flaps or apertures when open allowing for insertion of the digital camera. The retaining means further comprises apertures 31 to support viewing of the object through the camera view finder and 32 to support photographing of the object through the camera lens. An aperture or button 30 is also provided located adjacent to a trigger on the digital camera housed within the retaining means 21. Said aperture or button 30 provides a means to operate the digital camera in taking a single picture of the object being imaged. FIG. 7 thus illustrates a retaining means which may be set up on the base portion of a scanner housing to fixedly support a digital camera at an appropriate height below an object to be imaged such as a paper based document e.g. a letter or a photograph. The housing further allows for focusing by viewing the object through LCD view finder 11 or display means 31 and providing access to camera focus controls and further provides a means for taking the picture, hence capturing an image of the object, through aperture or camera button 30.

The retaining means may take the form of a shoe locating with the camera to fixedly support and lock in position the camera during use or in the form of a boxed format comprising a substantially rectangular frame suitable to house a digital camera. Such retaining means may be easily detachable from the housing. This means that a combination of housing with one of a number of retaining means 21 which may be suitable to support one or several different makes/models of digital camera is accommodated. Retaining means 21 may be formed from a plastic molding for instance. In this way a digital camera may be pushed into a recess in the plastic molding being secured by a snap fit mechanism. By selecting the correct type of retaining means for a particular make/model of camera this ensures that when in position in the retaining means, the controls to operate the digital camera are accessible, in particular the operating control, typically a button, which is pressed to take a single picture.

In the first specific embodiment inserting the digital camera into retaining means 21 and securing said digital camera e.g. by a snap fit mechanism or by appropriate clips, straps, screws, etc. allows for the user to operate the digital camera in taking a single picture by depressing an operating means located on said camera. This may be effected through buttons or projections on the retaining means.

In the first specific embodiment operating the digital camera to record a single digital image of the object to be scanned 24 results in the digital image being recorded on a memory means within the digital camera. The camera may be removed from the retaining means, transported elsewhere if necessary before downloading the image to a computer system such as a personal computer.

Figure 10:
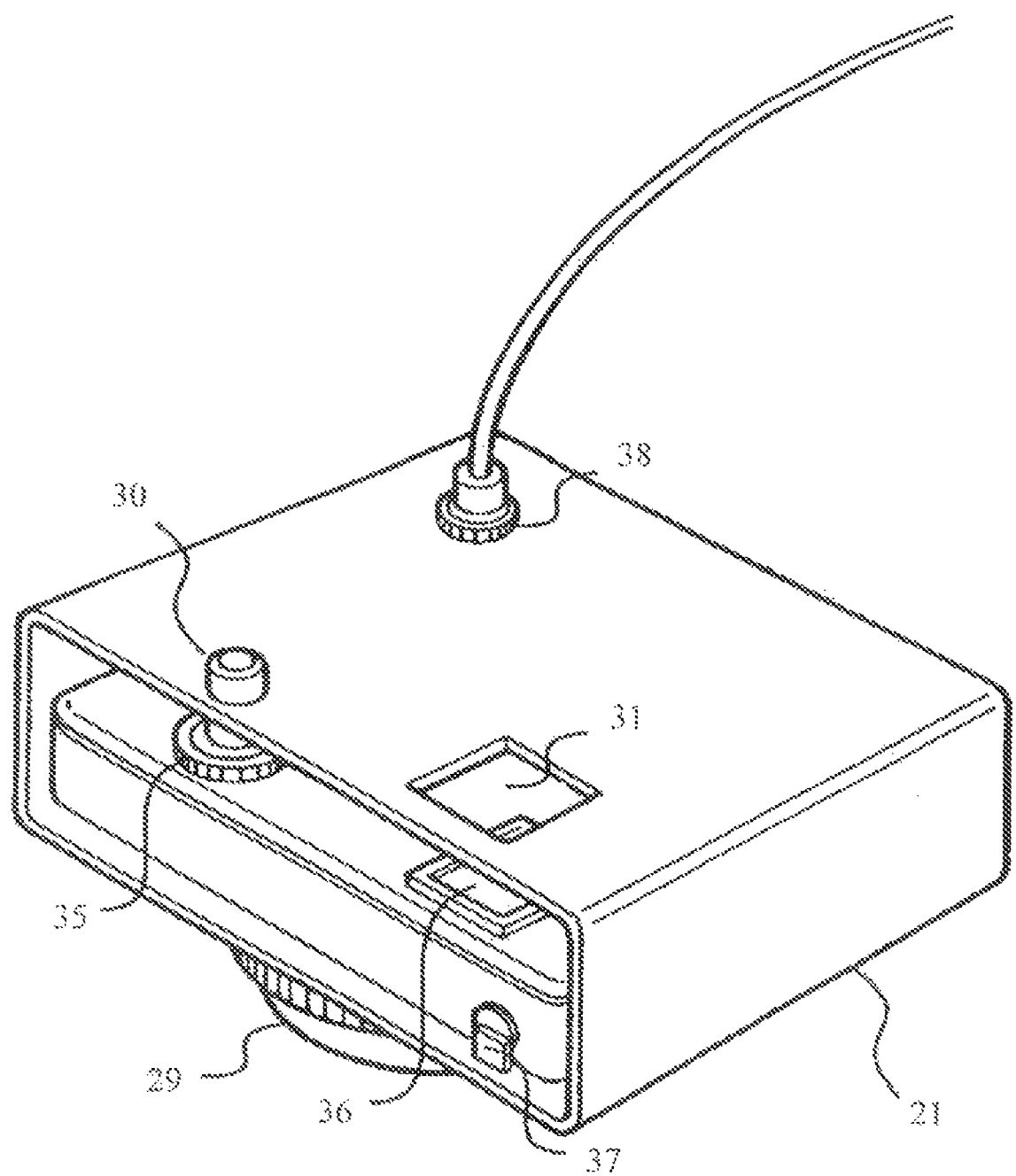
FIG. 10 illustrates another form of retaining means including suitable apertures, abutments/projections and buttons for use in configuring and operating the digital camera during document capture.

A further aperture 38 is provided in the housing wall to allow an electrical connection to be formed through a suitable socket (FIG. 10). Such a socket may be plugged into an appropriate electrical connection on the digital camera and thus allows for connection of the camera by means of wires and cables 33 etc. (FIG. 8) to an external processing unit such as a personal computer. This is required when the image being recorded is to be directly downloaded to a computer system. Any other available interface to the camera could be used in a similar manner, for example, optical, magnetic or radio signals could be passed to a suitable interface in the camera by appropriate means associated with the housing. A further modification of retaining means 21 includes a projection 37. This projection forms an abutment specifically placed within the housing wall of retaining means 21 to be located with a suitable button or other switch etc. on the camera when the camera is positioned in the housing to provide a specific command. For instance, this command may be to configure the camera to operate in a mode suitable for recording images of a required resolution and quality for image capture and downloading to a computer system. That is, to configure the camera to operate in a document capture mode. It is appreciated that different makes and models of digital camera include buttons, switches, etc. for operating different modes in a variety of locations. Hence, the scanning housing is designed to be compatible with one of a number of retaining means. A particular retaining means is suitable to house one or a number of makes and models of digital camera. Each retaining means therefore has one or a number of abutments/ projections for locating with specific buttons, switches etc. on these different makes and models of digital cameras to operate a certain mode in order to operate the digital camera in a document capture mode. This may be achieved by having a number of abutments/projections on an individual retaining means wherein when one make of a digital camera is inserted only one of the abutments/projections locates with an appropriate button/switch to operate a particular mode. The other abutments/projections do not perform a function whilst that particular make and model of camera is being used. Conversely, inserting a different make and model of digital camera can use a separate abutment/projection to operate a particular mode of operation of the camera.

The retaining means 21 may comprise means for configuring the digital camera. These may be in the form of specific abutments/projections. Considering a plastic molding as the retaining means 21 such abutments/projections may be integrally molded in specific positions. On placing the digital camera into retaining means 21 securing by a previously described snap fit or other mechanism, abutments/projections locate with specific buttons, switches, etc. mechanically depressing these buttons, switches, etc. on the camera. A single retaining means may be designed to house a number of different makes/models of digital camera wherein a number of abutments/projections exist on each retaining means with only one or a plurality of said abutments/projections being in use at any one time. These abutments/projections provide means for configuring individual digital cameras by instructing the camera to modify its use of the optic and imaging algorithms into a document capture mode. The effect is that the digital camera is able to determine that it is in the housing and can configure itself, by means of pre-stored instructions to enter a mode of operation for capturing images of documents.

Additional integral components of the retaining means 21 may include electrical connections in the form of ports, sockets, etc. These provide for an interface between the digital camera and the housing which may be further connected by means of wires etc. to an external computer system e.g. the desktop personal computer. This means that on placing the digital camera into position not only are means to enable camera operation located correctly, such as the buttons 30, apertures 31 and 32, etc. but electrical connection are made which allow the user to immediately download images to a personal computer by means of appropriately connected wires and cables such as USB cable connection that is now a standard feature available in all digital cameras to connect the digital camera to a personal computer or other peripherals. Wireless signals such as Bluetooth or WiFi are also becoming standard in digital cameras to connect the digital camera to a personal computer or other peripherals. In this way, the digital camera may be instructed to bypass its own memory means and download image data directly to a computer device. This means that the number of "scanned" imaged produced by the camera, through document capture, at any one time is not dependent on the size of its memory means, but is more dependent on receiving a continuous power source. Although this will commonly be supplied by a battery located within the digital camera, the retaining means 21 may provide further electrical connection means to provide input of an external power source to the camera. A further advantageous possibility is for an electrical connection to be provided in the retaining means 21 to enable the battery located within the digital camera to be recharged. Electrical connections including wires etc. may be provided within the housing and retaining means being linked to operating means e.g. a switch and further linked to a power source through a domestic type plug and socket.

Interaction with the camera mediated by the retaining means 21 is not limited to that necessary to achieve correct camera location, or to allow downloading of images to a personal computer (or other appropriate appliance). A particularly desirable use for such further interaction is to enable image capture and processing to be optimized for document capture. The requirements of document capture are very different from those of scene capture, particularly in relation to text. Features that may benefit from optimization for document capture are aperture, shutter speed, flash illumination, white balance and image sharpening for example. Means (whether by setting of manually activated buttons, by switches operated electronically or otherwise, or by interaction with the operating system of the camera) to set one or more of these features for optimal document capture can further improve the achievable performance.

In embodiments of the present invention a light source may be included as part of the document capture (flatbed scanner) housing operable by a control means present on part of the housing. The light source may be adjustable in position such that the object being imaged can be illuminated to allow high quality, high resolution digital images to be recorded by the digital camera enclosed within the document capture housing. Alternatively, the light source may be placed adjacent to or as part of the camera or the retaining means. The light source is an electric lamp of suitable power to provide illumination of the object being scanned. The light source may be manipulated such that the light projects in one of a plurality of directions to provide appropriate illumination of the object to be scanned. The light source described above may comprise more than one individual light source. The use of two light sources can provide for more constant light distribution across the document to be imaged. Each light may further be positioned at points distant from the camera and retaining means to suitably illuminate the document to be imaged thus preventing reflection of light being seen on the document during imaging by the camera.

Figure 9:
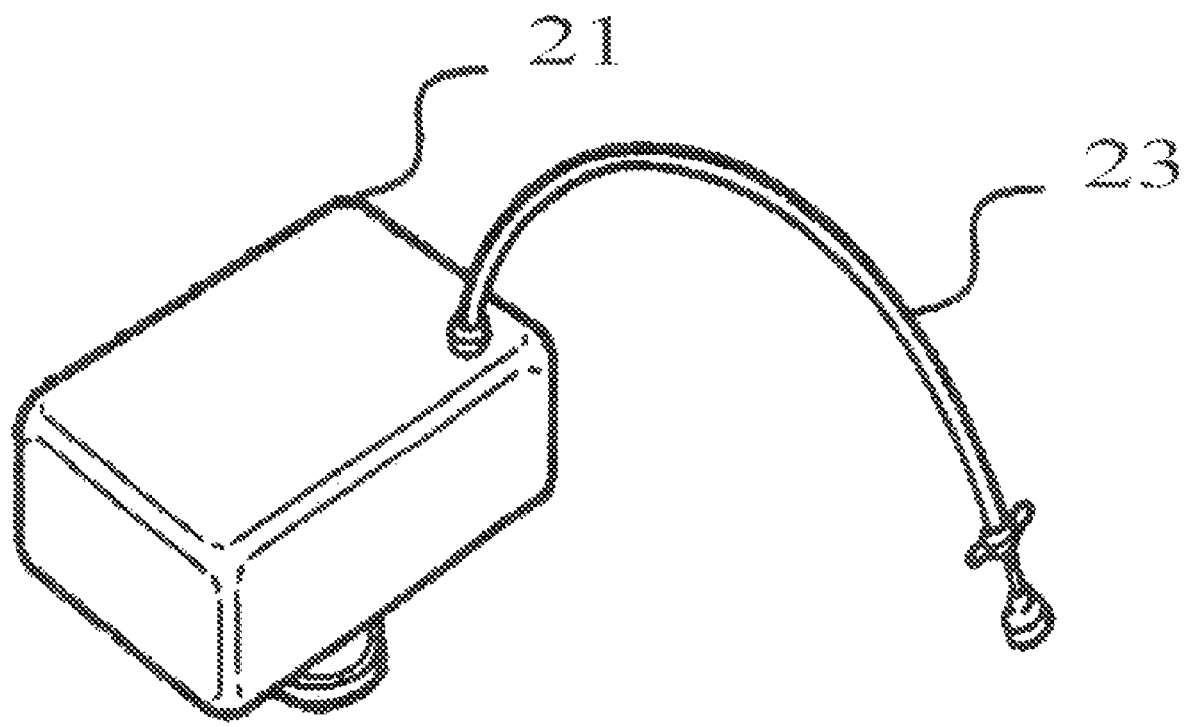
FIG. 9 is a perspective view of a retaining means (shown overturned) constructed according to a sixth embodiment of the present invention for an alternative manual operation of the digital camera or digital video camera.

Further illustrated in FIG. 9 is alternative means of operating the digital camera. This is provided by remote operating means 23 connected to the retaining means 21. This may be in the form of a flexible wire containing a central rod connected to a plunger. Depressing the plunger mechanically presses a button on the camera instructing the camera to take a single photographic image. This type of operating means is equivalent to that known to be used on many prior art analogue cameras. Remote operation is also possible through the standard USB cable connecting the camera to the personal computer. Remote operation is also possible through using infrared or other type of remote control unit which is becoming a standard feature in all digital cameras.

Figure 11:
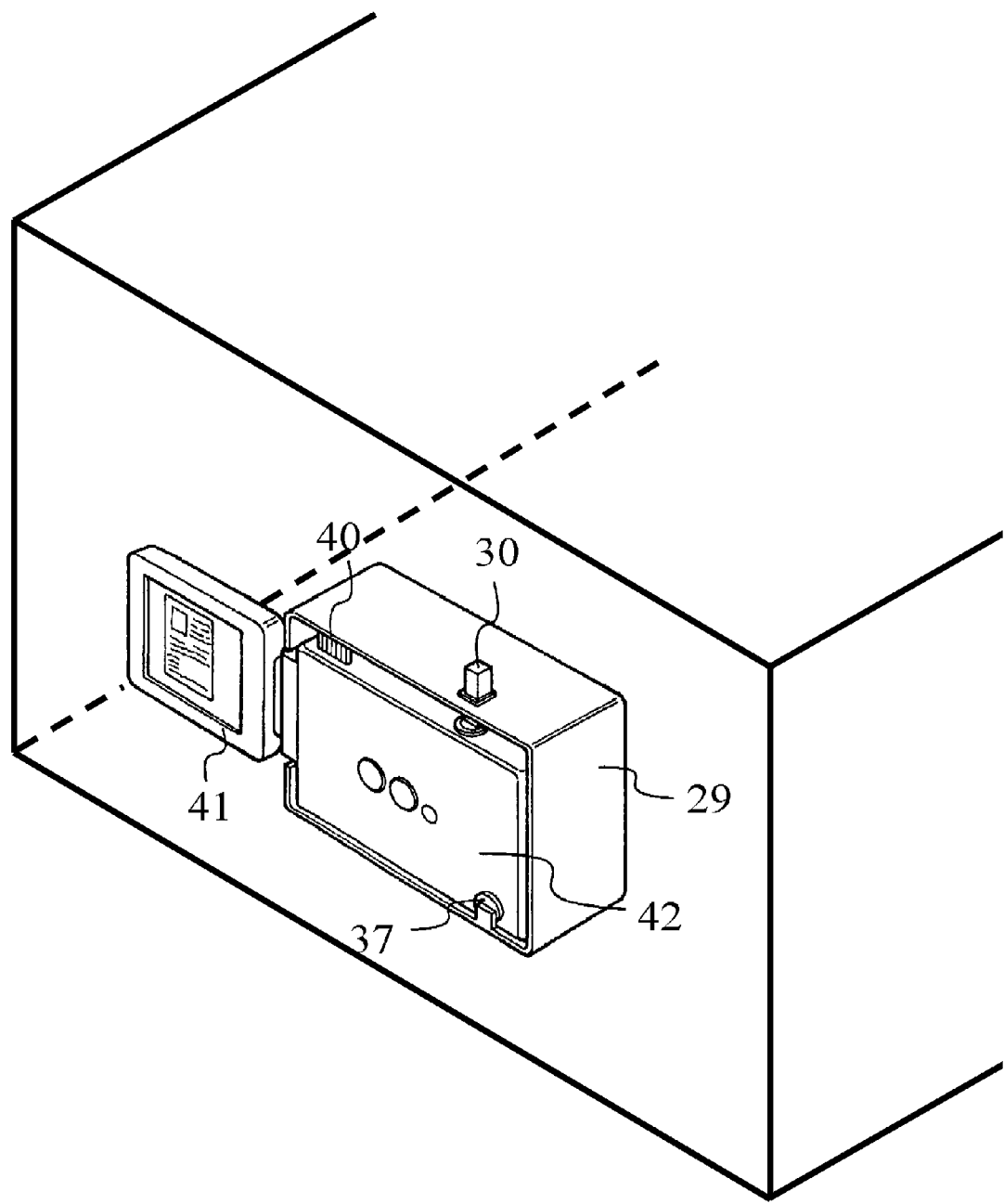
FIG. 11 illustrates a document capture housing with retaining means suitable for retaining a digital camera or digital video camera with an integrated LCD viewfinder to facilitate the use of the viewfinder in the process of imaging an object.

In another specific embodiment there is a document capture housing incorporating all of, or a combination of, the features of both the other specific embodiments on the present invention. Illustrated in FIG. 11 is a retaining means in the form of a boxed format comprising a substantially rectangular frame to house a digital camera or digital video camera to enable the use of the camera LCD display 41. The retaining means 21 has been adapted to support housing of a digital camera or digital video camera. Abutments/projections 37 provide means for configuring the camera in a document capture mode, button 30 provides a means to enable camera operation and electrical connection 40 provides a means of connecting the camera to a personal computer system via appropriately connected wires and cables. The means for configuring 37 not only places the camera in a mode where the use of the cameras optic and imaging algorithms are adapted for scanning but further places the camera in a mode for recording still frame images rather than moving frame images. The digital camera 8 or digital video camera 42 may be located in retaining means 21 by a snap fir mechanism or by appropriately placed clips, straps, screws, etc. However, the commonly incorporated liquid crystal display screen 41 is appropriately free of the retaining means such that it may be viewed by the user and hence facilitates the user in obtaining the required image. The user may view the LCD display 41 while within the housing through a transmissive platen, an opening in a non-transmissive platen, or through a plane where a side platen has been eliminated. For digital video cameras not including such LCD screen an appropriate aperture 31 through which the view finder 36 can project may exist.

Illustrated in FIG. 8 is an imaging system according to a fifth specific embodiment of the present invention, the document capture housing is provided in which a digital still camera or digital video camera can be placed in retaining means 21 to take a still frame image of the object 24. A plurality of adjustable light sources may be required to provide appropriate illumination. These light sources can be operated by an operating means, e.g. a switch. An image obtained by a camera within retaining means 21 can be downloaded by wires 33 to a personal computer 34 which can adjust, manipulate, etc., the obtained image. The image can also be recorded on a portable recording medium, e.g., a hard disk of a computer. Alternatively, the downloaded image can be reprinted through an associated printer or can be distributed to other users via electronic communications, e.g. e-mail or computer fax systems.

It is known in the prior art for digital cameras to provide the home user with the opportunity to simply and relatively cheaply apply a number of effects to their pictures. This is due to the ability of prior art digital cameras to incorporate a number of modes of operation. Such modes of operation are achieved by utilization of one of a number of specific imaging algorithms. One of the types of mode into which digital cameras can be placed is that of a document capture mode. The document capture mode sets up the camera such that the camera is configured to provide a high quality of resolution over images a short distance away. Resolution of digital cameras is further increasing, however, it is expected that a resolution of at least 300 dots per inch will provide suitable resolution to obtain images of documents, etc., such that a digital camera can operate to perform functions equivalent to those of a prior art scanner. To obtain higher quality imaging, resolutions of 600 dpi or more are required. Considering prior art digital cameras the inventor has realized that the shortest distance between camera lens and object to be imaged is presently approximately ¼ meters considering the image to be an A4 size document. Operation of the document capture mode modifies the camera to make use of its optic in an appropriate manner. Hence, by placing a digital camera or digital video camera in an appropriate mode the camera can be used to obtain images of documents or pictures etc. which may be downloaded to a computer system. This facility is equivalent to that provided by prior art scanning devices such as flatbed scanners. To facilitate the use of digital cameras in this manner the inventor has provided a document capture housing which may take one of several forms detailed in the embodiments herein described above.

The communications means to accommodate downloading of information from an external source; in this case a digital camera or digital video camera; a micro-processor; memory area and a user interface are well known to those experts in the art and may be applied without departing from the spirit of the present invention. Memory area and micro-processor comprise a logical entity which may operate by means of a number of specific image processing algorithms to improve the clarity and quality of the downloaded image. Such improvements in clarity and quality may include sharpening individual characters within text, removing background noise, repairing/eliminating image distortion etc. Although some digital cameras may incorporate text capture modes that provide an initial processing of the image to improve clarity and quality of the image incorporation of these algorithms within the computer means that image processing can occur regardless of the make or model of digital camera used. One example of a specific processing algorithm would be an algorithm directed at optimizing the image obtained from a color image photo-sensor on the digital camera where the image itself is largely monochrome as will often be the case where a letter or pages of text is the object imaged by the digital camera. A second specific algorithm may compensate for the spatial and temporal variation in intensity of ambient lighting illuminating the object which is to be imaged.

In the fifth embodiment of the present invention the personal computer provides the processing power and algorithms where the digital camera is configured to output image data directly following document capture and does not rely on the digital camera processing the image. By manipulating the computer to appropriately select the correct algorithms(s) the downloaded image can be processed accordingly. A further modification to the retaining means may involve further abutments/projections acting as switches which when in combination with a personal computer and connected by appropriate wires and cables allows the computer to determine what make the model of camera is connected and therefore enables the computer to utilize the appropriate imaging algorithms to process the results accordingly. This may be achieved by transmission of an identification sequence to the personal computer on placing the camera into the retaining means.

The embodiments described herein above provide for a portable document-capture housing which can be rapidly put into functional use by appropriately placing a digital camera in the retaining means 21. Once in position the camera can be used to rapidly "scan" documents, pictures, etc. by recording single still photographic digital images and either recording in a memory means within the camera or immediately downloading to a computer network system. The housing may be stored whilst not in use and the digital camera may be removed from retaining means 21 and used externally of the document capture housing to take still frame photographic digital images at the user's convenience.

It should be noted that although the embodiments described herein mainly indicate configuration of the camera by means of the housing through cooperation between projections associated with the housing and switched of the camera or through electrical connections made to the camera, other configuration means are available. Optical means may be provided, either to change the optical path between the camera and an imaged document or to provide an optical connection as an alternative to electrical signal communication with the camera. Magnetic means may also be provided to activate camera switches. Other means to communicate with the camera as to operate or transfer images, such as wireless or infrared, including using a remote controller, could also be used if these are supported by the camera itself.

All of the embodiments described herein include document capture housings of basic design, simply supporting a digital camera including digital video cameras for operation as a document imaging device independent of a personal computer unit as well as housings increasing in complexity including features such as a light, means for configuring the camera in a document capture mode, electrical connections, button and apertures providing a means to enable camera operation, etc.

In all aspects of the present invention said digital image capture module may be any digital image capture device or optic detection system comprising a 2D image photo-sensor such as a digital camera or a digital video camera and are all equivalent.

Although the present invention has been described with reference to the preferred embodiment thereof, it is apparent to those skilled in the art that a variety of modifications and changed my be made without departing from the scope of the present invention which is intended to be defined by the appended claims.

Those skilled in the art will recognize that when automatic operation is required a regular automatic optional document feeder may be used to position each document sheet of the glass surface with synchronized capture of the image from the camera. This does not require significant modification by those skilled in the art.

The skilled in the art will also recognize that when an image is distorted by, for example, using reflective mirror or close capture of the digital image capture device or digital camera it may be corrected by digital manipulation using methods and systems for reducing distortion or using optical lens.

The skilled in the art will easily recognize once the image is captured it may be edited, manipulated, or enhanced using technology available to the skilled in the art without further experimentation including for example using OCR for text recognition or outputting to a computer or a printer.

The skilled in the art will easily recognize that the flatbed scanner of the present invention maybe integrated with other devices or incorporated into multifunction imaging machines that scan, copy, fax, print, file, transmit, recognize, read, etc. using technology available to the skilled in the art without further experimentation. Furthermore, captured image may be directed manually or automatically to other devices such as fax machine, copier, printer, or multifunction device, and the like.

From the foregoing description, one skilled in the art can easily ascertain the essential characteristics of this invention and, without departing from the spirit and scope thereof, can make various changes and modifications of the invention to adapt it to various usages and conditions. Such variations and changes may include, for example, altering the number of components in the housing or using equivalents. It is believed that such can be accomplished without excessive experimentation. In any case, any such variations are all claimed under the scope of this invention.

The methods of the present invention have been explained with reference to plurality or references the teachings of which are all incorporated herein by reference.

This invention has been described hereinabove, although with reference to a plurality of illustrative exemplary and preferred embodiments, it is to be understood that is in no way to be construed as limiting but only to provide examples. However, it is readily appreciated that, from reading this disclosure, the invention may be embodied in other specific forms without departing from the spirit or essential characteristics or attributes to bring modifications by replacing some elements of this invention as practiced by their equivalents, which would achieve the same goal thereof and accordingly reference should be made to the appended claims, rather than to the foregoing specification, as indicating the scope of the invention. Accordingly, those skilled in the art will recognize, or be able to ascertain using no more than routine experimentation, many equivalents to the specific embodiments and the scope of the invention being indicated by the appended claims described herein. Such equivalents, obvious variations, and all changes which come within the meaning and equivalency of the claims are therefore intended to be encompassed therein and are deemed covered by the claims of this invention.

That which is claimed:

1. A method of scanning a document, comprising the steps of:

providing a digital image-capture module, said digital image-capture module comprising a 2D image photo-sensor, a plurality of light sources, an electronic circuit, and software contained within a housing with said housing having a top platen, a bottom platen and a plurality of side platens, wherein said digital image-capture module is located on the bottom platen, said top platen and a front platen both being transparent;

positioning an item to be scanned on said top platen, wherein said light sources are attached to said housing and are positioned in said housing to illuminate the item to be scanned, at least one of said plurality of light sources being connected to said bottom platen;

scanning the item to be scanned with said digital image-capture module, said digital image-capture module being a digital camera;

storing images generated by said digital image-capture module on a computer, wherein said digital image-capture module is connected to the computer;

said digital image-capture module selectively zooming in and out to capture a predefined scan area, wherein said top platen has a detachable scanning window cover to hold down the item to be scanned;

providing a second digital image-capture module connected to one of said side platens with an opposite one of said side platens being transparent, the item to be scanned being a bound book having first and second opposed pages, the first page thereof being positioned on said top platen, the second page thereof being positioned on the transparent side platen; and scanning the second page with said second digital image-capture module.

* * * * *